US008958455B2

(12) United States Patent
Lacatus et al.

(10) Patent No.: US 8,958,455 B2
(45) Date of Patent: Feb. 17, 2015

(54) LOW ENERGY SIGNALING SCHEME FOR BEACON FENCING APPLICATIONS

(71) Applicant: QUALCOMM Incorporated, San Diego, CA (US)

(72) Inventors: Catalin Lacatus, San Diego, CA (US); Hemish K. Parikh, San Diego, CA (US); Harleen K. Gill, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/831,737

(22) Filed: Mar. 15, 2013

(65) Prior Publication Data
US 2014/0269842 A1 Sep. 18, 2014

(51) Int. Cl.
H04B 1/00 (2006.01)
H04B 1/7156 (2011.01)
H04W 4/02 (2009.01)
H04W 56/00 (2009.01)

(52) U.S. Cl.
CPC ............. *H04B 1/7156* (2013.01); *H04W 4/021* (2013.01); *H04W 56/002* (2013.01)
USPC ........................................................ 375/133

(58) Field of Classification Search
CPC .. H04B 1/713; H04B 1/7156; H04B 17/0057; H04B 1/1615
USPC .................. 375/133, 130, 132, 138; 455/450, 455/452.2; 370/329
See application file for complete search history.

(56) References Cited

U.S. PATENT DOCUMENTS

| 5,121,408 | A | 6/1992 | Cai et al. |
| 7,620,409 | B2 * | 11/2009 | Budampati et al. ........... 455/502 |
| 7,756,086 | B2 | 7/2010 | Petite et al. |
| 8,031,650 | B2 | 10/2011 | Petite et al. |
| 8,270,424 | B2 * | 9/2012 | Rao ............................... 370/431 |
| 2003/0016732 | A1 | 1/2003 | Miklos et al. |
| 2010/0226342 | A1 | 9/2010 | Colling et al. |

FOREIGN PATENT DOCUMENTS

| EP | 0423715 A2 | 4/1991 |
| JP | H08331012 A | 12/1996 |
| WO | 02073559 A2 | 9/2002 |

OTHER PUBLICATIONS

International Search Report and Written Opinion—PCT/US2014/025894—ISA/EPO—Jul. 11, 2014.

* cited by examiner

*Primary Examiner* — Khai Tran
(74) *Attorney, Agent, or Firm* — The Marbury Law Group, PLLC

(57) ABSTRACT

Systems, methods, and devices of the various embodiments provide modified frequency hopping patterns that enable synchronization of a wireless tracking device with a beacon signal that defines a predetermined area (i.e., beacon fence). In an embodiment, a beacon may transmit a beacon signal according to a modified frequency hopping pattern and a wireless tracking device may receive the beacon signal by tuning a receiver according to the frequency hopping pattern. In an embodiment, the modified frequency hopping pattern may include a reference frequency generated at a high redundancy pattern multiplexed with a pseudo random sequence of frequencies. In an embodiment, the packets of the beacon signal transmitted at the reference frequency may include an indication of the next frequency according to the modified frequency hopping pattern.

42 Claims, 16 Drawing Sheets

LOW ENERGY SIGNALING SCHEME FOR BEACON FENCING APPLICATIONS

BACKGROUND

A common use of wireless technologies involves tracking an asset (e.g., a pet, car, person, etc.) using a portable and wireless tracking device. In one approach to such uses, the wireless tracking device may communicate wirelessly with one or more beacons to determine when the wireless tracking device enters, remains inside, and/or leaves a predetermined area or areas (i.e., a beacon fence).

Frequency hopping spread spectrum (FHSS) transmission methods provide a robust and efficient way to provide the wireless communications between a wireless tracking device and a beacon in such applications. However, FHSS methods require synchronization between the beacon and the wireless tracking device in order to coordinate the sequence of pseudorandom frequency hops of the carrier signal. If the wireless tracking device and beacon lose synchronization, the wireless tracking device may consume significant amounts of power trying to reestablish synchronization with the beacon. For example, once out of sync with the beacon, the wireless tracking device would not know the next frequency hop and would have to expend power guessing frequencies to try to find the beacon again. A wireless tracking device could waste substantial amounts power by guessing incorrectly or guessing while the wireless tracking device is out of range. High power consumption in such situations may be undesirable since wireless tracking devices usually have a limited power supply (i.e., a battery). Additionally, a wireless tracking device using traditional FHSS methods may waste substantial amounts of time searching for the frequency hopping pattern transmitted by the beacon because in traditional FHSS methods all the pseudorandom frequencies must be searched by the wireless tracking device to reestablish synchronization with the beacon.

SUMMARY

The systems, methods, and devices of the various embodiments provide modified frequency hopping patterns that enable synchronization between a wireless tracking device and a beacon in beacon fencing (i.e., beacon fence) applications. In an embodiment, a beacon may transmit a beacon signal according to a modified frequency hopping pattern and a wireless tracking device may receive the beacon signal by tuning a receiver according to the frequency hopping pattern. In an embodiment, the modified frequency hopping pattern may include a reference frequency generated at a high redundancy pattern multiplexed with a pseudo random sequence of frequencies. In an embodiment, the packets of the beacon signal transmitted at the reference frequency may be appended with an indication of the next frequency according to the modified frequency hopping pattern.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
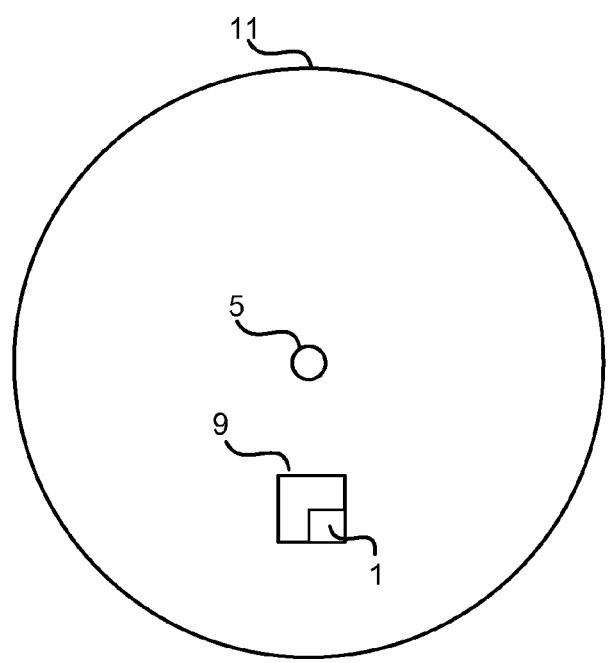
FIG. 1 is a planar view illustrating a predetermined area (i.e., beacon fence) with a beacon having a transceiver and an asset with a wireless tracking device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "wireless tracking device" and "tracking device" are used interchangeably herein to refer to any one or all of electronic tracking tags, asset wireless tracking devices, cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for receiving a beacon signal and determining when the wireless tracking device enters, remains inside, and/or leaves a predetermined area or areas.

As used herein, the term "beacon" refers to any form of electronic device that includes a programmable processor and circuitry for transmitting a beacon signal over a predetermined area or areas, such as to define a beacon fence boundary.

Various embodiments incorporate both a radio frequency (RF) receiver, such as a low power RF receiver, and a relatively high power cellular telephone transceiver into a wireless tracking device. In an embodiment, a relatively small predetermined area (i.e., a beacon fence) may be defined as the area in which a wireless tracking device's radio can receive a radio frequency beacon signal, such as a relatively short range radio frequency beacon signal transmitted by a beacon. When the wireless tracking device is removed from the predetermined area, and thus radio signals from the beacon may no longer be received, the wireless tracking device may transition to a beacon breach condition or operating mode, which may include sending an alarm or initiating communications with another device via a long-range wireless network, such as a cellular data network. In an embodiment, when the wireless tracking device determines it is in a beacon breach condition, the wireless tracking device may activate its GPS unit and/or begin transmitting communication signals from its high power transceiver. In an embodiment, the location determined by the GPS unit enables the wireless tracking device to confirm that the wireless tracking device is actually outside the predetermined area. In a further embodiment, the wireless tracking device's GPS coordinates may be included in communication signals transmitted from the wireless tracking device's high power transceiver. In this manner, when outside the predetermined area (i.e., beacon fence), the wireless tracking device may be tracked with communication signals transmitted from the wireless tracking device's high power transceiver.

Frequency hopping spread spectrum (FHSS) transmission methods provide a robust and efficient way to communicate between a wireless tracking device and a beacon. However, FHSS methods require synchronization between the beacon and wireless tracking device in order to coordinate the sequence of pseudorandom frequency hops of the carrier signal. If the wireless tracking device and beacon lose synchronization with each other, the wireless tracking device may consume significant amounts of power trying to reestablish synchronization with the beacon. For example, once out of sync with the beacon, the wireless tracking device would not know the next frequency hop and would have to expend power guessing frequencies to try to find the beacon again. A wireless tracking device could waste substantial amounts power by guessing incorrectly or guessing while the wireless tracking device is out of range. High power consumption is undesirable since wireless tracking devices usually have a limited power supply (i.e., a battery). Additionally, a wireless tracking device using traditional FHSS methods may waste substantial amounts of time searching for the frequency hopping pattern transmitted by the beacon because in traditional FHSS methods all the pseudorandom frequencies must be searched by the wireless tracking device to reestablish synchronization with the beacon The systems, methods, and devices of the various embodiments provide a dual signaling scheme for beacon fencing applications by multiplexing a high redundancy pattern of a reference frequency for a beacon with a pseudo random sequence of frequencies to generate a modified frequency hopping pattern. In the modified frequency hopping pattern the reference frequency may repeat with a reference periodicity. In an embodiment, the reference periodicity may be less than the total number of frequencies (e.g., channels) included in the modified frequency hopping pattern. In this manner, the modified frequency hopping pattern may enable a wireless tracking device to decrease the time needed to search for and synchronize with a beacon because less than all the frequencies/channels used by the beacon need to be searched.

In an embodiment, a beacon may select one or more reference frequencies for use in generating a modified frequency hopping pattern from a memory available to the beacon. The one or more reference frequencies may be pre-provisioned to a beacon or may be provided by a tracking system server upon a beacon registration process. The beacon may be pre-provisioned with a high redundancy pattern and/or algorithms for generating a high redundancy pattern and may generate a high redundancy pattern of the selected one or more reference frequencies. Additionally, a beacon may be pre-provisioned with a pseudo random sequence of frequencies and/or algorithms for generating pseudo random sequences of frequencies. In an embodiment, a tracking system server may associate an individual beacon with its one or more reference frequencies, high frequency pattern, and/or pseudo random sequence of frequencies. The beacon may multiplex the high redundancy patterns of the one or more reference frequencies with the pseudo random sequence of frequencies to generate the modified frequency hopping pattern. The beacon may transmit its beacon signal by switching a carrier signal for the beacon signal according to the modified frequency hopping pattern.

In an embodiment, a wireless tracking device may receive/select one or more reference frequency corresponding to the reference frequency selected by a beacon. The wireless tracking device may receive/select the reference frequency in various ways. As an example, the wireless tracking device may receive the reference frequency for the beacon as part of a registration/pairing process for establishing a safe zone (i.e., beacon fence) for an asset being tracked by the wireless tracking device. As another example, the wireless tracking device may receive the reference frequency from a tracking system server upon registration of the wireless tracking device and/or beacon with a user account. As a further example, the wireless tracking device may be pre-provisioned with one or more reference frequencies for one or more beacons at the time of manufacture. The wireless tracking device may be pre-provisioned with a high redundancy pattern and/or algorithms for generating a high redundancy pattern and may generate a high redundancy pattern of the received/selected one or more reference frequencies. Additionally, a wireless tracking device may be pre-provisioned with a pseudo random sequence of frequencies and/or algorithms for generating pseudo random sequences of frequencies. In an embodiment, a tracking system server may indicate to the wireless tracking device the one or more reference frequencies, the high redundancy pattern, and/or the pseudo random sequence of frequencies to use when paired with a specific beacon. In another embodiment, beacons and wireless tracking devices may utilize the same default one or more reference frequencies, default high redundancy pattern, and/or default pseudo random sequences regardless of the beacon/wireless tracking device pair. The wireless tracking device may multiplex the high redundancy pattern of the one or more reference frequencies with the pseudo random sequence of frequencies to generate the modified frequency hopping pattern. By using the same one or more reference frequencies, same high redundancy pattern, and the same pseudo random sequence of frequencies at the wireless tracking device and beacon, the beacon and wireless tracking device may generate the same modified frequency hopping pattern. The wireless tracking device may receive the beacon signal transmitted by the beacon by tuning a receiver of the wireless tracking device to the carrier signal frequency according to the modified frequency hopping pattern.

In an embodiment, the beacon signal may include communication packets. The packets of the beacon signal may include preamble synchronization bits, the beacon's ID, data, and check values, for example. In an embodiment, packets transmitted on the reference signal may be appended to include an indication of the next frequency on which the beacon will transmit according to the modified frequency hopping pattern. The wireless tracking device may decode the beacon signal and, using the indication of the next frequency, may determine the frequency to which to tune its receiver to in order to receive the carrier signal at the next time interval. The wireless tracking device may also synchronize with the modified frequency hopping pattern by comparing the sequence of the reference signal and next frequency to the modified frequency hopping pattern. A match of the reference frequency and next frequency order may indicate the current point in the beacon's modified frequency hopping pattern, thereby enabling the wireless tracking device to synchronize its receiver with the beacon transmitter.

In an embodiment, the wireless tracking device may determine it is located outside the predetermined area (i.e., beacon fence/coverage) based on failing to decode a beacon signal within a threshold number of frequencies. As an example, a wireless tracking device failing to detect a beacon signal within seven consecutive frequencies of a modified frequency hopping pattern may determine that it is no longer in range of the beacon and is therefore outside of the predetermine area (i.e., beacon fence/coverage). In an embodiment, when a wireless tracking device is outside of the predetermined area, the wireless tracking device may transition to an out of beacon operating state. In an embodiment, in the out of beacon state the wireless tracking device may attempt to reacquire the beacon signal without searching all possible frequencies used by a beacon by tuning its receiver to the reference frequency and periodically attempting to decode the beacon signal at the reference frequency. In this manner, the wireless tracking device may save power by not searching for all possible beacon signal frequencies. Additionally, the wireless tracking device may recognize when it has reentered the beacon coverage more quickly because the reference signal may repeat at a higher periodicity. In an embodiment, the wireless tracking device may determine that it is located back inside a predetermined area (i.e., beacon fence) based on successfully decoding a beacon signal within a number of frequencies, such as two successive frequencies. As an example, a wireless tracking device decoding the beacon signal successfully at the reference frequency and at the next frequency indicated in a reference signal packet may determine that it is located within the beacon coverage defined by the beacon's signal.

In an embodiment, a beacon may transmit the beacon signal at multiple reference frequencies. As an example, the beacon signal may be transmitted at a first reference frequency and at a second reference frequency that may be a multiple of the first reference frequency. A wireless tracking device may determine that interference is occurring on at the first reference frequency and may tune its receiver to another reference frequency, such as the second reference frequency to receive the beacon signal. In another embodiment, the wireless tracking device may search all frequencies for the beacon signal when interference prevents the wireless tracking device from decoding the beacon signal at the first reference frequency.

FIG. 1 is a planar view illustrating a predetermined area (i.e., beacon fence) 11 with a beacon 5 according to an embodiment. The beacon 5 may be configured with a radio transmitter, such as a low-power, short range radio transmitter, to output a beacon signal. The asset 9 with a wireless tracking device 1 attached is illustrated as being initially located within the predetermined area 11. The wireless tracking device 1 may be configured with a radio receiver, such as a low-power, short range radio receiver, to receive the beacon signal output by the beacon 5. If the asset 9 is a pet, such as a dog, the predetermined area 11 may include a house and the surrounding property. In an alternative embodiment, a large predetermined area 11 may include more than one beacon 5 spaced apart so as to provide signal coverage of the entire predetermined area 11.

Figure 2:
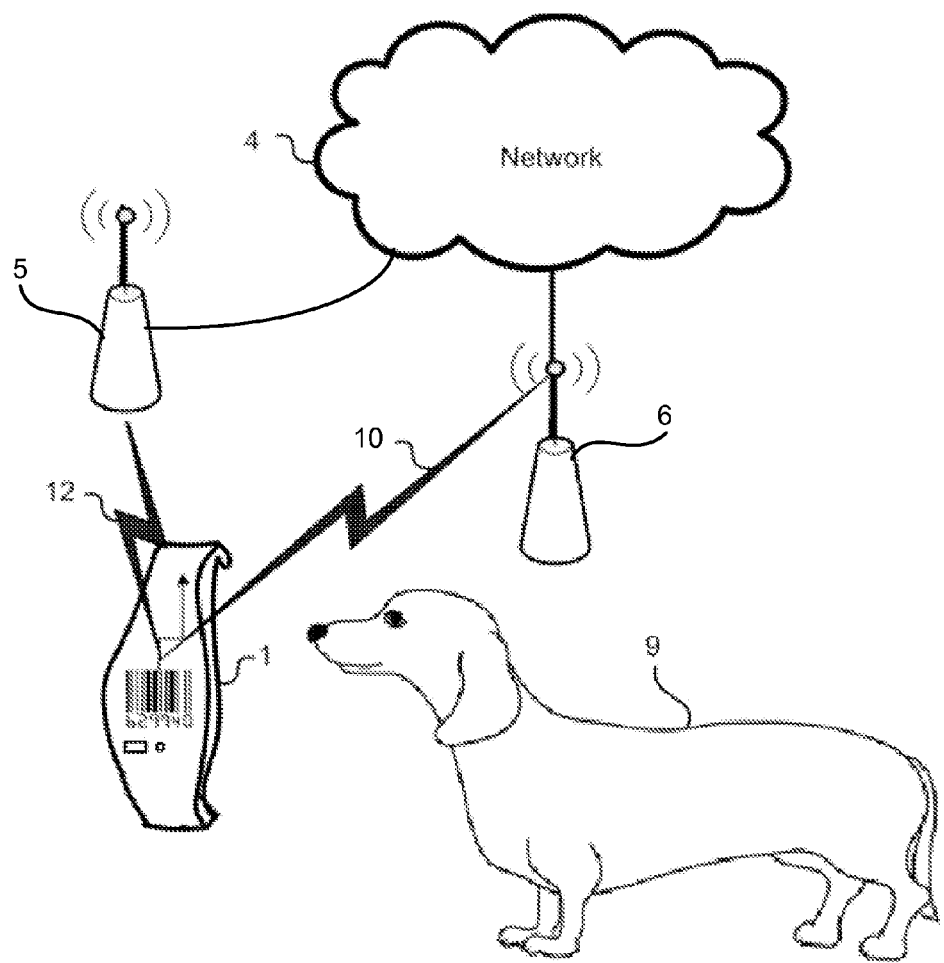
FIGS. 2 and 3 are communication system block diagrams of communication networks that include a wireless tracking device linked to a local wireless communication network suitable for use with the various embodiments.

FIG. 2 illustrates elements of a communication system, including a wireless tracking device 1 to be placed on an asset 9 suitable for use with the various embodiments. The wireless tracking device 1 may include a radio receiver, such as an internal short range radio receiver for receiving the beacon signal 12 from the beacon 5, and a long range radio or wireless transceiver for establishing long range wireless communications links 10 with a cellular base station 6 of a cellular data network 4, such as a cellular telephone system. In an embodiment, the beacon 5 may establish its own link to the cellular data network 4.

Figure 3:
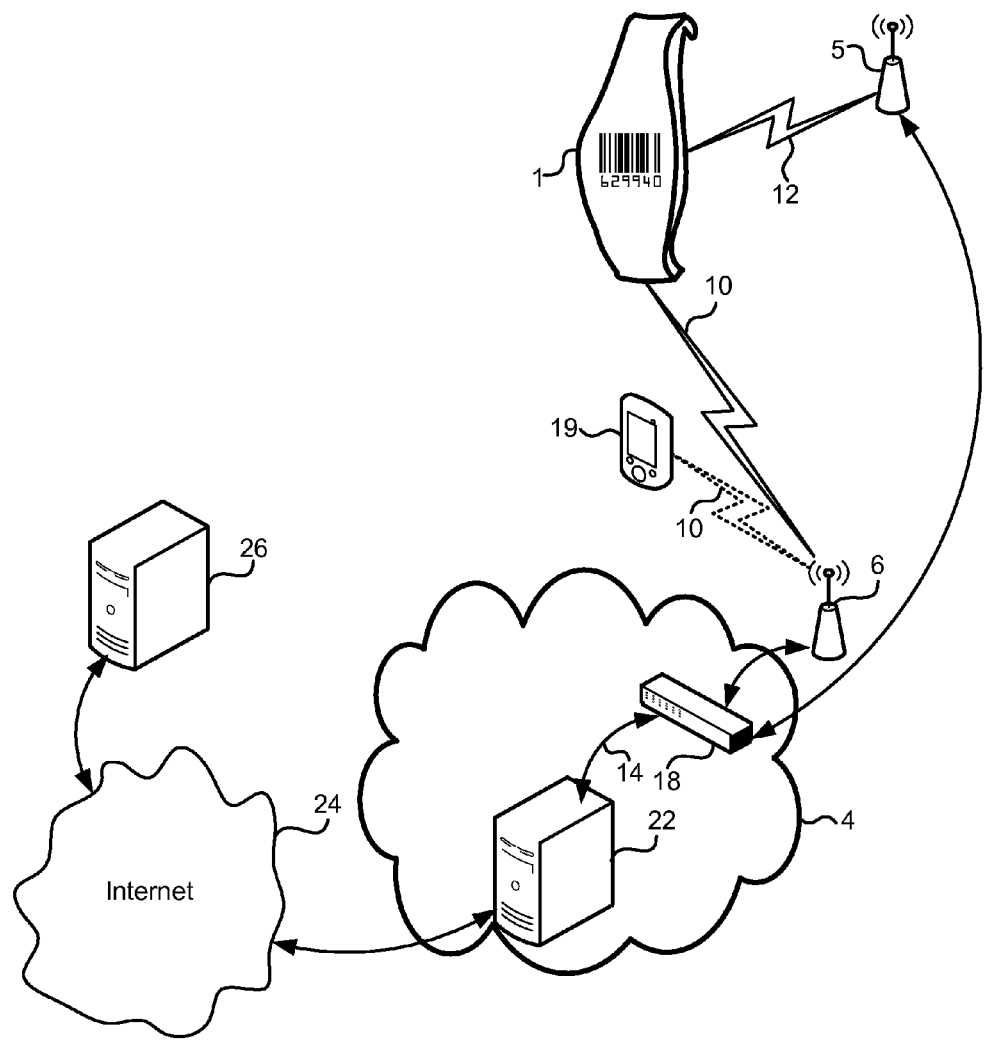

FIG. 3 illustrates another communication system suitable for use with the various embodiments. The communication system illustrated in FIG. 3 includes the elements illustrated in FIG. 2, with the addition of remote server(s) 26 configured to provide asset monitoring services. As is well known, a cellular data network 4 may include switching centers 18 that are coupled in network connections 14 to Internet gateway server(s) 22 to enable data connections to the Internet 24. A cellular data network 4 may also enable telephone calls to be made to cellular telephones 19 as well as landline telephones (not shown). Through the Internet 24, messages may be sent to remote server(s) 26 configured to provide asset monitoring services. In the various embodiments, the wireless tracking device 1 may include one or more processors and memory that enable the device to execute algorithms for accomplishing the asset tracking functions.

Figure 4:
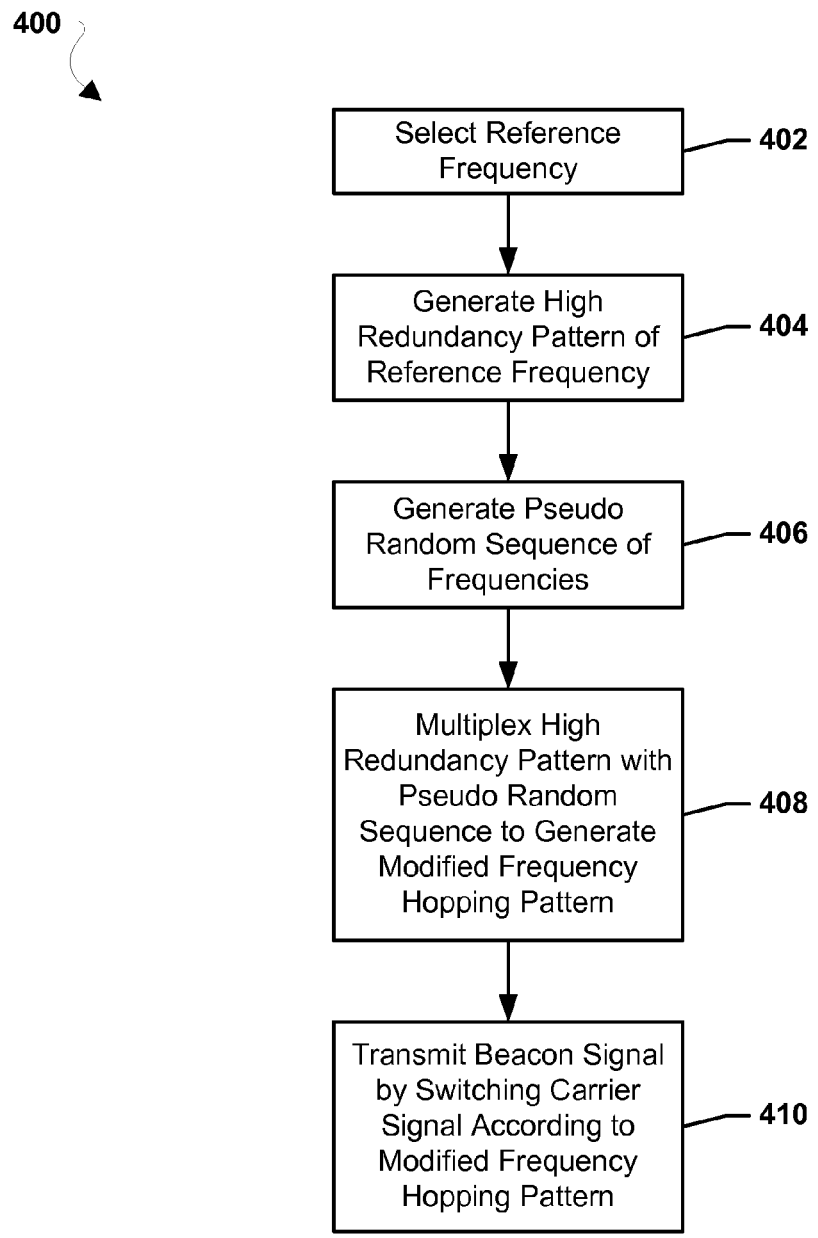
FIG. 4 is a process flow diagram illustrating an embodiment method for transmitting a beacon signal according to a modified frequency hopping pattern.

FIG. 4 illustrates an embodiment method 400 for transmitting a beacon signal according to a modified frequency hopping pattern. In an embodiment, the operations of method 400 may be performed by the processor of a beacon operating in an asset tracking system. In an embodiment, the operations of method 400 may be performed by the beacon processor at an initialization time, such as upon deployment of the beacon and/or power up of the beacon. In block 402 the beacon processor may select a reference frequency. A reference frequency may be a frequency at which the beacon will transmit a carrier signal onto which the beacon signal is encoded. In an embodiment, the reference frequency may be pre-provisioned in a memory available to the beacon processor, and the beacon processor may select the reference frequency from the memory. In another embodiment, the reference frequency may be transmitted to the beacon from an asset tracking system server. In a further embodiment, more than one reference frequency may be selected by the beacon processor.

In block 404 the beacon processor may generate a high redundancy pattern of the reference frequency. A high redundancy pattern may be a pattern that repeats periodically. In an embodiment, the time between repetitions of the reference frequency may be constant in the high redundancy pattern, and the time between repetitions may be the reference period. In an embodiment, the reference period may be less than the total time that is necessary to transmit a pseudo random sequence of all frequencies (i.e., channels) used by the beacon in a frequency hopping scheme. High redundancy patterns are discussed in more detail below with reference to FIG. 6.

In block 406 the beacon processor may generate a pseudo random sequence of frequencies. A pseudo random sequence of frequencies may be a pattern of a number of frequencies that a carrier signal of the beacon will hop to as the beacon signal is transmitted. In an embodiment, the pseudo random sequence of frequencies may be pre-provisioned to the beacon and/or transmitted to the beacon from an asset tracking system server and stored in a memory available to the beacon. In another embodiment, an algorithm for generating the pseudo random sequence may be stored in a memory available to the beacon and the beacon may generate the pseudo random sequence of frequencies according to the algorithm. The pseudo random sequence of frequencies is discussed in more detail below with reference to FIG. 6.

In block 408 the beacon processor may multiplex the high redundancy pattern with the pseudo random sequence of frequencies to generate a modified frequency hopping pattern. In an embodiment, the modified frequency hopping pattern may be stored in a memory available to the beacon processor. In an embodiment, the modified frequency hopping pattern may indicate the frequencies and the time duration for each frequency at which a carrier signal will be transmitted. In an embodiment, each frequency may be used to transmit the carrier signal for the same duration of time. The modified frequency hopping pattern is discussed in more detail below with reference to FIG. 6. In block 410 the beacon processor may transmit the beacon signal by switching a carrier signal frequency according to the modified frequency hopping pattern. In an embodiment, the beacon processor may transmit the beacon signal via a carrier signal transmitted from the beacon's transmitter at the frequency specified in the modified frequency hopping pattern. In this manner, the beacon may generate a beacon signal that changes (i.e., hops) frequencies according to the modified frequency hopping pattern.

Figure 5:
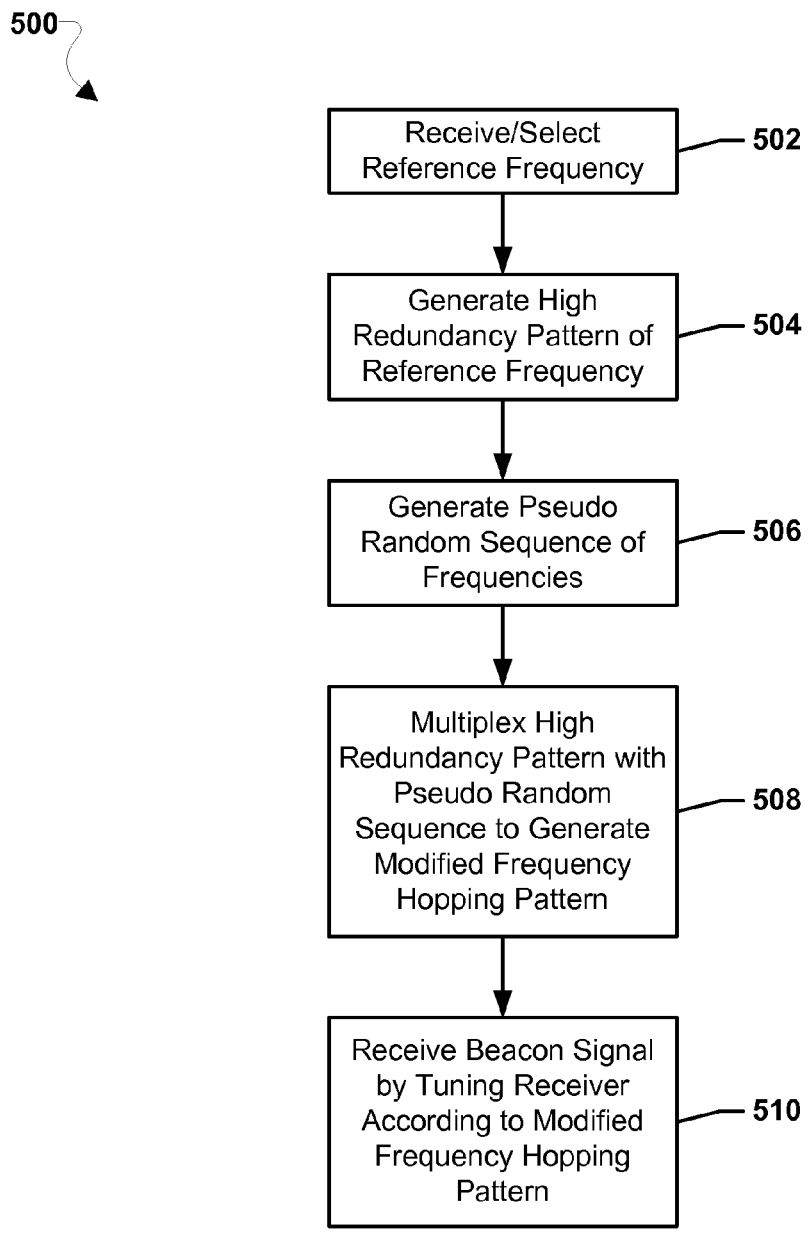
FIG. 5 is a process flow diagram illustrating an embodiment method for receiving a beacon signal according to a modified frequency hopping pattern.

FIG. 5 illustrates an embodiment method 500 for receiving a beacon signal transmitted according to a modified frequency hopping pattern. In an embodiment, the operations of method 500 may be performed by the processor of a wireless tracking device operating in an asset tracking system. In an embodiment, the operations of method 500 may be performed by the wireless tracking device processor at an initialization time, such as upon deployment of the wireless tracking device, power up of the wireless tracking device, and/or registration/pairing of the wireless tracking device with a beacon to define a beacon fence/coverage. In block 502 the wireless tracking device processor may receiver/select a reference frequency. A reference frequency may be the frequency of a carrier signal onto which that beacon's beacon signal is modulated or encoded, the beacon signal defining the boundaries of the beacon fence in which the wireless tracking device is to be used. In an embodiment, the reference frequency may be pre-provisioned in a memory available to the wireless tracking device processor, and the wireless tracking device processor may access the reference frequency from the memory. In another embodiment, the reference frequency may be transmitted to the wireless tracking device from an asset tracking system server. In a further embodiment, more than one reference frequency may be selected for monitoring by the wireless tracking device processor.

In block 504 the wireless tracking device processor may generate a high redundancy for the reference frequency. In an embodiment, the high redundancy pattern used by the wireless tracking device may be the same high redundancy pattern used by a beacon with which the wireless tracking device is or may be paired to monitor a beacon area. As discussed above, a high redundancy pattern may be a pattern that repeats periodically. In an embodiment, the time between repetitions of the reference frequency may be constant in the high redundancy pattern, and the time between repetitions may be the reference period. In an embodiment, the reference period may be less than the total time that is necessary for a beacon to transmit a pseudo random sequence of all frequencies (i.e., channels) used by the beacon in a frequency hopping scheme. In an embodiment, the wireless tracking device may receive an indication of the high redundancy pattern to use from a server of an asset tracking system. High redundancy patterns are discussed in more detail below with reference to FIG. 6.

In block 506 the wireless tracking device processor may generate a pseudo random sequence of frequencies that a carrier signal of the beacon will hop to as the beacon signal is transmitted. In an embodiment, the pseudo random sequence of frequencies may be pre-provisioned to the wireless tracking device and/or transmitted to the wireless tracking device from an asset tracking system server and stored in a memory available to the wireless tracking device, such as when the wireless tracking device is paired with its beacon. In another embodiment, an algorithm for generating the pseudo random sequence may be stored in a memory available to the wireless tracking device, and the wireless tracking device processor may generate the pseudo random sequence of frequencies according to the algorithm.

In block 508 the wireless tracking device processor may multiplex the high redundancy pattern with the pseudo random sequence of frequencies to generate a modified frequency hopping pattern, which may be stored in a memory available to the wireless tracking device processor. In an embodiment, the modified frequency hopping pattern may indicate the frequencies and the time duration for each frequency at which a carrier signal will be transmitted by a beacon with which the wireless tracking device is paired. In this manner, the modified frequency hopping pattern may also indicate the frequencies to which the receiver of the wireless tracking device may be tuned to receive the carrier signal from the beacon at a given time. In an embodiment, each frequency may be used to transmit the carrier signal for the same duration of time.

In block 510 the wireless tracking device processor may receive the carrier signal encoding the beacon signal by tuning its receiver according to the modified frequency hopping pattern. In this manner, the wireless tracking device may receive a beacon signal that changes (i.e., hops) frequencies according to the modified frequency hopping pattern.

Figure 6:
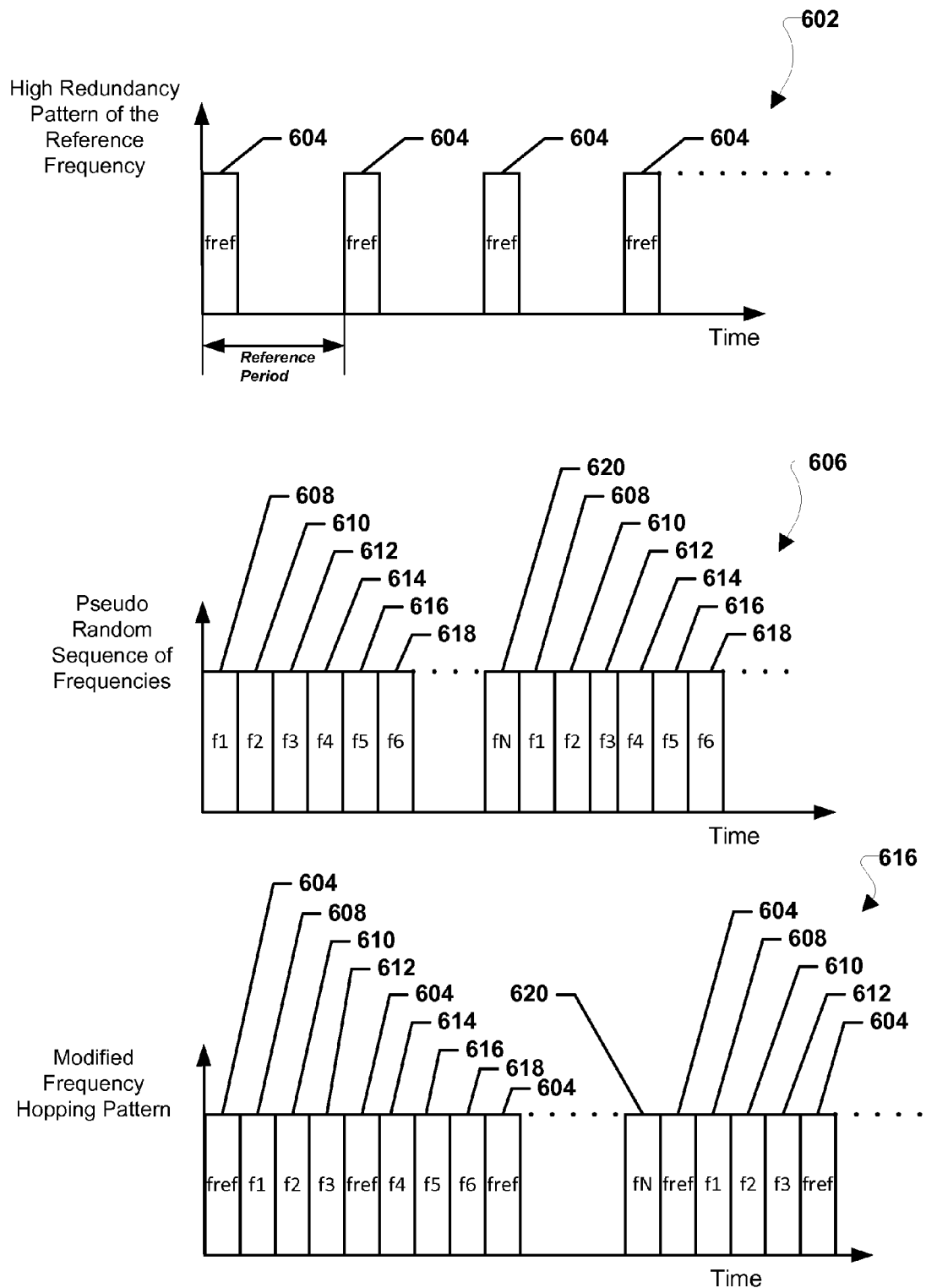
FIG. 6 illustrates frequency hopping patterns according to the various embodiments.

FIG. 6 illustrates a high redundancy pattern of the reference frequency 602, a pseudo random sequence of frequencies 606, and a modified frequency hopping pattern 616. The high redundancy pattern of the reference frequency 602 may be a pattern of the selected reference frequency 604 generated repeatedly at a given reference period. In an embodiment, the reference period may be selected to reduce the time required by a wireless tracking device to detect a beacon signal. The pseudo random sequence of frequencies 606 may be a pseudo random sequence of frequencies 608, 610, 612, 614, 616, 618, and 620. While illustrated as seven different frequencies 608, 610, 612, 614, 616, 618, and 620, the pseudo random sequence of frequencies 606 may include more or less frequencies (i.e., channels), such as 79 frequencies (i.e., channels). As discussed above with reference to FIGS. 4 and 5, the high redundancy pattern of the reference frequency 602 may be multiplexed with the pseudo random sequence of frequencies 606 to generate the modified frequency hopping pattern 616. The modified frequency hopping pattern 616 may include reference frequencies 604 interspersed a fixed intervals with other frequencies 608, 610, 612, 614, 616, 618, and 620. In this manner, the frequencies may be broken into groups, such as frequencies 608, 610, and 612, bookended by reference frequency instances 604. Additionally, the next frequency after each instance of the reference frequency 604 may be determined according to the modified frequency hopping pattern 616. As examples, after the first instance of the reference frequency 604 the next frequency may be frequency 608 and after the second instance of the reference frequency 604 the next frequency may be frequency 614.

Figure 7:
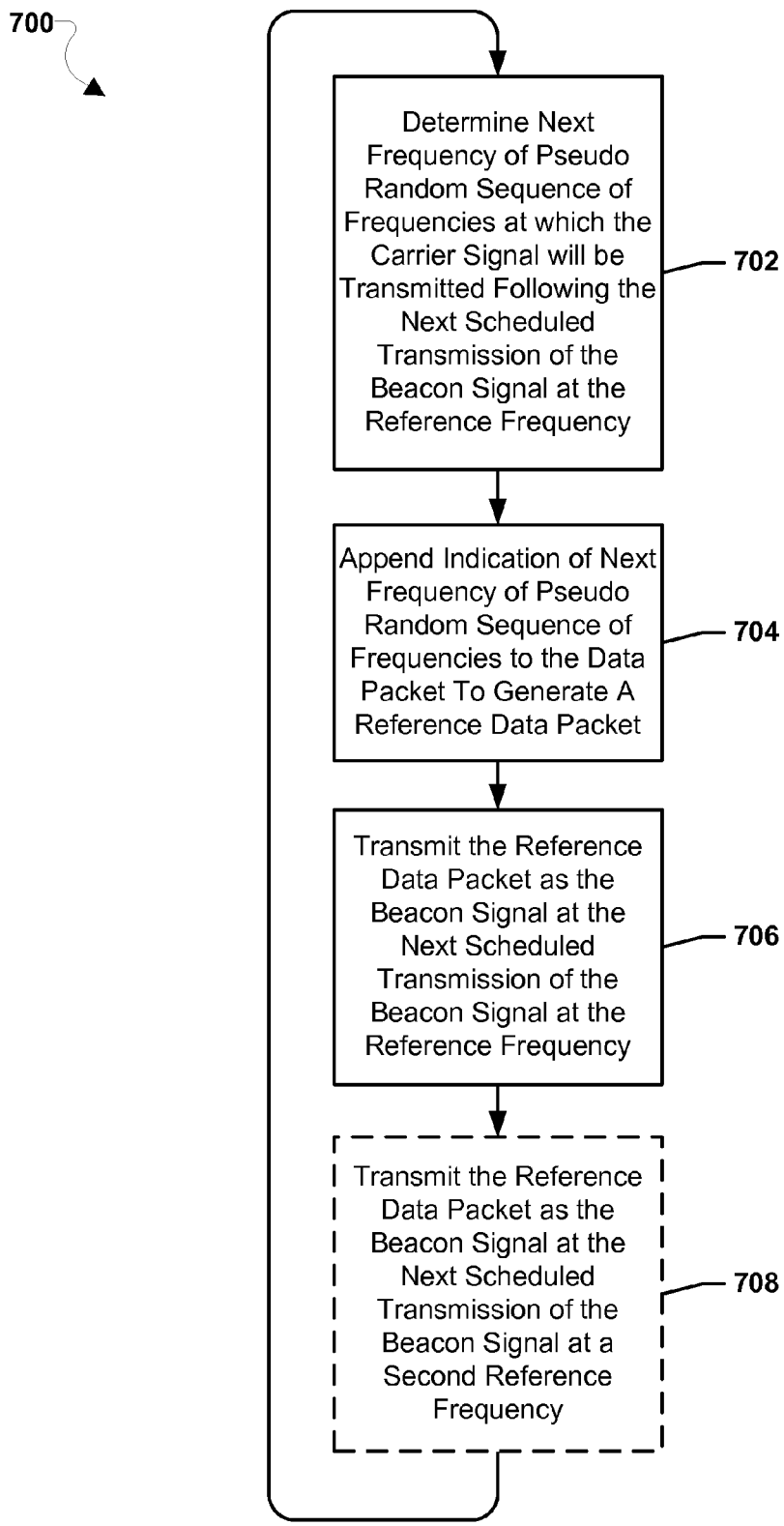
FIG. 7 is a process flow diagram illustrating an embodiment method for generating a reference data packet.

FIG. 7 illustrates an embodiment method 700 for generating a reference data packet. In an embodiment, the operations of method 700 may be performed by the processor of a beacon operating in an asset tracking system. The operations of method 700 may be performed in conjunction with the operations of method 400 described above with reference to FIG. 4. As discussed further below with reference to FIG. 9, in an embodiment, the beacon signal transmitted by the beacon may be a packetized signal. In block 702 the beacon processor may determine the next frequency of the pseudo random sequence of frequencies at which the carrier signal will be transmitted following the next scheduled transmission of the beacon signal at the reference frequency. In an embodiment, the beacon processor may look ahead in the modified frequency hopping pattern to determine the upcoming reference frequency transmission and determine the next frequency as the frequency listed in the modified frequency hopping pattern immediately following the upcoming reference frequency. In block 704 the beacon processor may append an indication of the next frequency of the pseudo random sequence of frequencies to the data packet or data packets assigned for transmission on the upcoming reference frequency to generate a reference data packet. In this manner, the reference data packet may differ from packets transmitted by the beacon on non-reference frequencies in that the reference data packets may include an indication of the next frequency to which the beacon will hop following the expiration of the time assigned for transmitting on the upcoming reference frequency according to the modified frequency hopping pattern. In block 706 the beacon processor may transmit the reference data packet as the beacon signal at the next schedule transmission of the beacon signal at the reference frequency.

In an optional embodiment, in block 708 the beacon processor may transmit the reference data packet as the beacon signal at the next scheduled transmission of the beacon signal at a second reference frequency. In an embodiment, the beacon may transmit the beacon signal at more than one reference frequency. As an example, the beacon may transmit the beacon signal at a second reference frequency that may be an increment (e.g., a multiple) of the first reference frequency. In this manner, should interference impact the beacon signal on the first reference frequency, the beacon signal and the reference data packet may still be successfully received by a wireless tracking device on the second reference frequency. Upon transmitting the reference data packet, in block 702 the beacon processor may again determine the next frequency following the next upcoming reference frequency scheduled transmission and generate a new reference data packet. In this manner, the beacon processor may continually generate reference data packets indicating the next frequency on which the beacon will transmit the beacon signal.

Figure 8:
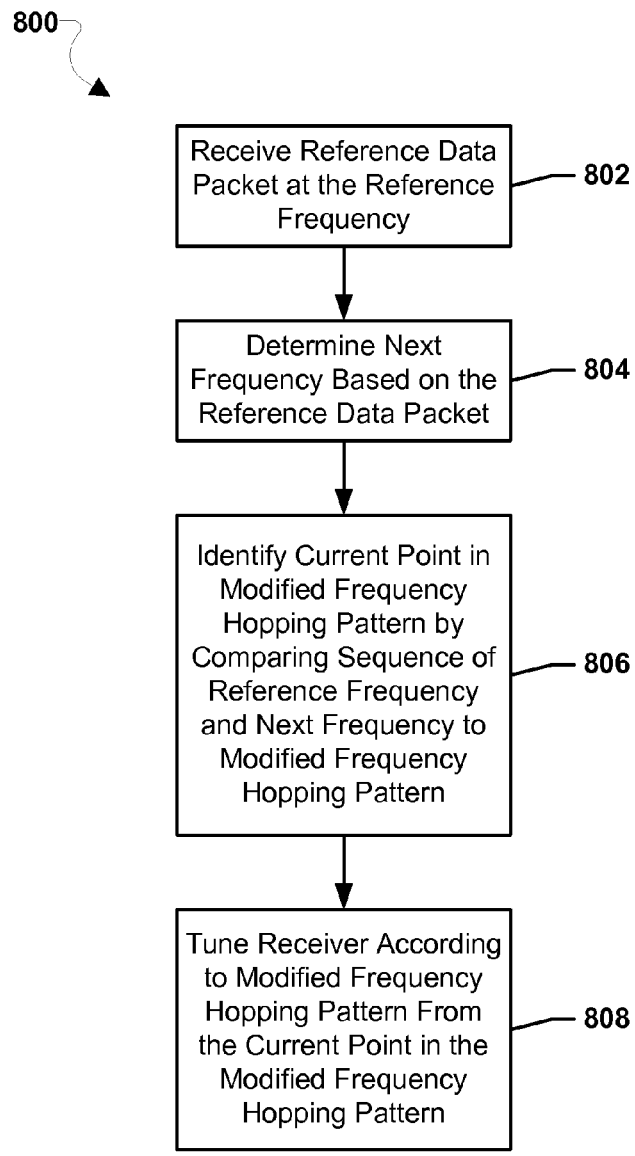
FIG. 8 is a process flow diagram illustrating an embodiment method for synchronizing a receiver to a modified frequency hopping pattern.

FIG. 8 illustrates an embodiment method 800 for synchronizing a receiver of a wireless tracking device to a modified frequency hopping pattern of a beacon. In an embodiment, the operations of method 800 may be performed by the processor of a wireless tracking device. The operations of method 800 may be performed in conjunction with the operations of method 500 described above with reference to FIG. 5. The operations of method 800 may enable a wireless tracking device to synchronize with a beacon performing the operations of method 700 described above with reference to FIG. 7. In block 802 the wireless tracking device processor may receive a reference data packet at the reference frequency. The wireless tracking device processor may receive a reference data packet at the reference frequency by tuning a receiver of the wireless tracking device to the reference frequency, receiving a carrier signal at the reference frequency and applying signal processing techniques to decode the received signal to generate the reference data packet(s) comprising the beacon signal. As discussed above, the reference data packet may include an indication of the next frequency to which the beacon will hop.

In block 804 the wireless tracking device processor may determine the next frequency at which the beacon will transmit the carrier signal based on the a stored modified frequency hopping pattern and/or the received reference data packet. In block 806 the wireless tracking device processor may identify the current point in the modified frequency hopping pattern by comparing the sequence of the reference frequency and next frequency to the modified frequency hopping pattern. As an example, the wireless tracking device processor may compare the pattern of reference frequencies followed by a next frequency to the entire modified frequency hopping pattern and identify a matching reference frequency and next frequency sequence as the current point in the modified frequency hopping pattern. In block 808 the wireless tracking device processor may tune the receiver of the wireless tracking device according to the modified frequency hopping pattern from the current point in the modified frequency hopping pattern. In this manner, the wireless tracking device may identify the point in the modified frequency hopping pattern at which the beacon is currently transmitting, thereby enabling it to synchronize the tuning its own receiver to frequency hop in concert with the beacon signal.

Figure 9:
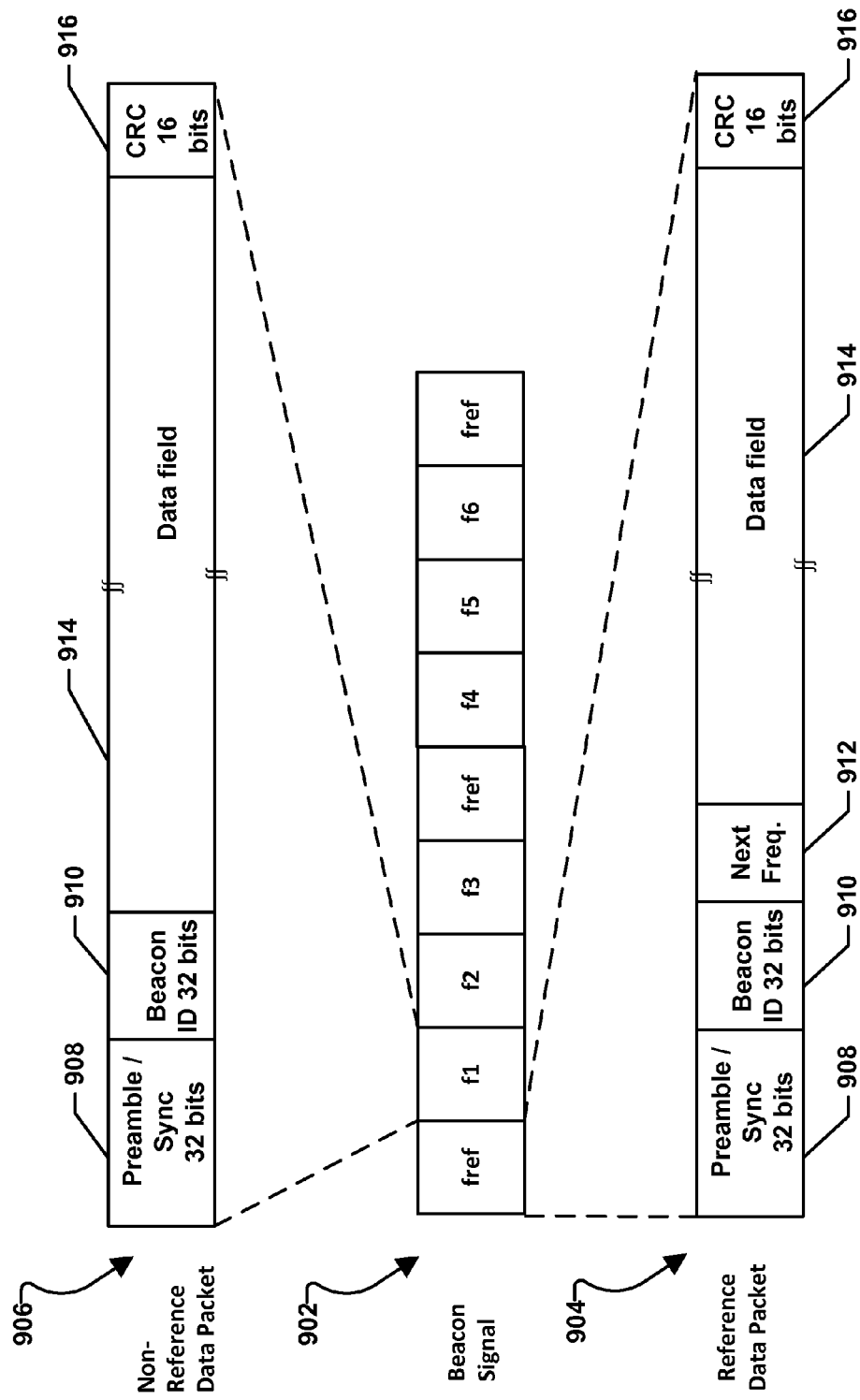
FIG. 9 illustrates packets in a beacon signal according to an embodiment.

FIG. 9 illustrates data packets 906 and 904 in a beacon signal 902 according to an embodiment. The beacon signal 902 may be comprised of reference data packets 904 and non-reference data packets 906. Reference data packets 904 may be data packets transmitted by the beacon on the reference frequency and may include an indication of the next frequency 912 on which the beacon will transmit the beacon signal. Non-reference data packets 906 may be data packets transmitted by the beacon on frequencies other than the reference frequency and may not include an indication of the next frequency 912. In an embodiment, other than the indication of the next frequency 912, reference data packets 904 and non-reference data packets 906 may have the same packet structure, each including preamble/synchronization bits 908, a beacon ID 910 of the beacon transmitting the packet, a data field 914, and check values 916, for example.

Figure 10:
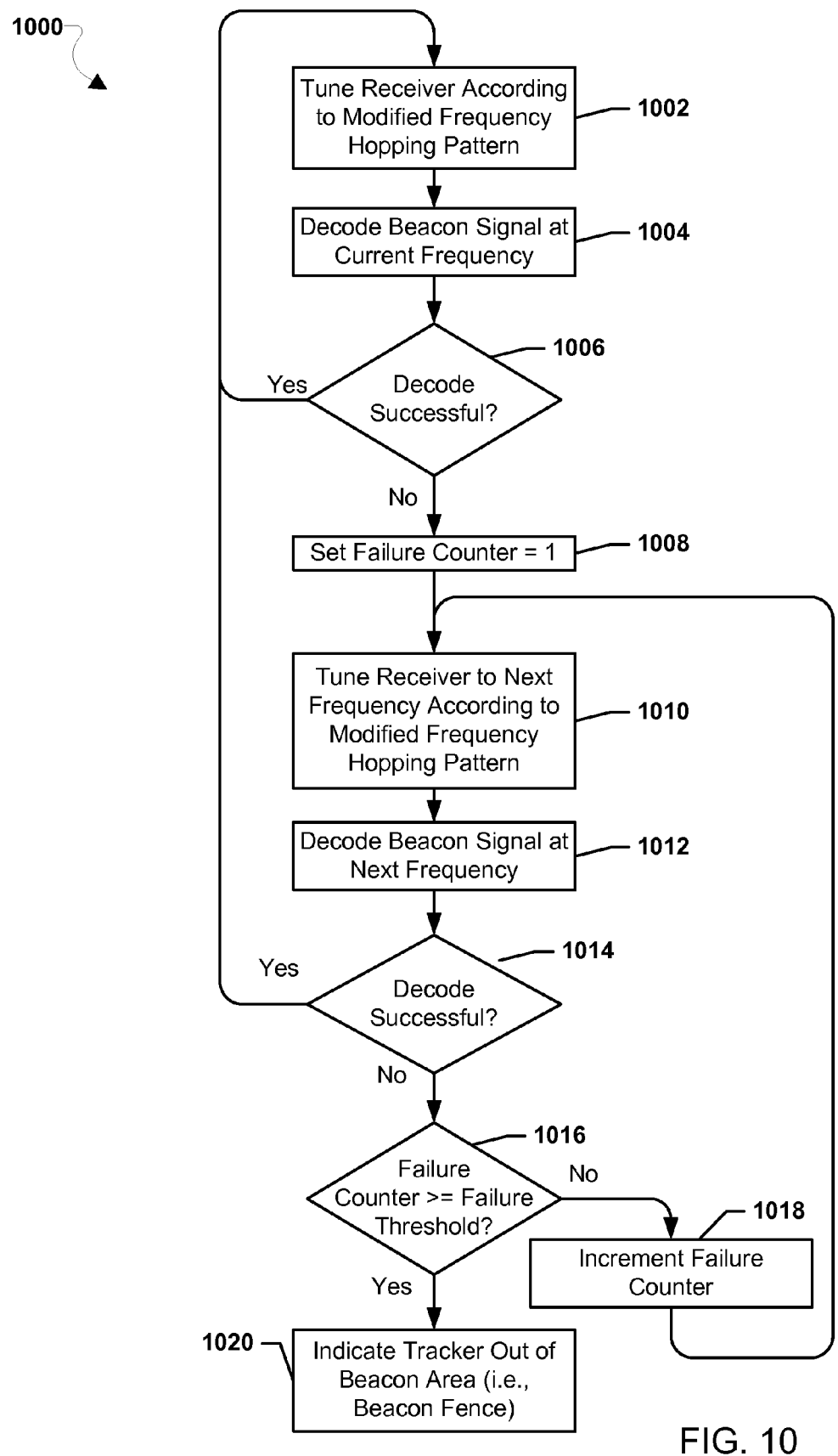
FIG. 10 is a process flow diagram illustrating an embodiment method for indicating a wireless tracking device is outside an area.

FIG. 10 illustrates an embodiment method 1000 for determining when a wireless tracking device is outside a beacon area (i.e., outside a beacon fence/coverage defined by the reception area/range of the beacon signal). In an embodiment, the operations of method 1000 may be performed by the processor of a wireless tracking device, and may be performed in conjunction with the operations of methods 500 and/or 800 described above. In block 1002 the wireless tracking device processor may tune its receiver according to the modified frequency hopping pattern obtained from memory. In block 1004 the wireless tracking device processor may attempt to decode the beacon signal at the frequency to which its receiver is currently tuned. In determination block 1006 the wireless tracking device processor may determine whether the beacon signal was successfully decoded. If the beacon signal was successfully decoded (i.e., determination block 1006="Yes"), in block 1002 the wireless tracking device processor may continue tuning the wireless tracking device receiver according to and in synch with the modified frequency hopping pattern.

If the beacon signal was not successfully decoded (i.e., determination block 1006="No"), in block 1008 the wireless tracking device processor may set a failure counter, such as by storing a "1" in a counter buffer. In block 1010 the wireless tracking device processor may tune the wireless tracking device receiver to the next frequency according to the modified frequency hopping pattern. In block 1012 the wireless tracking device processor may attempt to decode the beacon signal at the next frequency. In determination block 1014 the wireless tracking device processor may determine whether the beacon signal was successfully decoded. If the beacon signal was successfully decoded (i.e., determination block 1014="Yes"), in block 1002 the wireless tracking device processor may continue tuning the wireless tracking device receiver according to the modified frequency hopping pattern. In this manner, although the beacon signal was not initially decoded successfully, because it was decoded successfully at the next frequency the wireless tracking device processor can determine that it is not outside the beacon area, so there is no need to report a breach event.

If the beacon signal was not successfully decoded (i.e., determination block 1014="No"), in determination block 1016 the wireless tracking device processor may determine whether the failure counter is greater than or equal to a failure threshold. In an embodiment, a failure threshold may be a value stored in the memory available to the wireless tracking device. The failure threshold may indicate a number of consecutive unsuccessful decoding attempts, such as seven unsuccessful attempts, that the processor uses to indicate that the wireless tracking device is outside the beacon area. If the failure counter is less than the failure threshold (i.e., determination block 1016="No"), in block 1018 the wireless tracking device processor may increment the failure counter. As discussed above, in blocks 1010, 1012, 1014, and 1016 the wireless tracking device processor may tune the receiver to the next frequency within the pattern, attempt to decode the beacon signal at the subsequent next frequency, determined whether a packet from the beacon signal is successfully received, and compare the failure counter to the failure threshold if a packet from the beacon signal was not received. If a beacon signal packet was not received and the failure counter equals or exceeds the failure threshold (i.e., determination block 1016="Yes"), in block 1020 the wireless tracking device processor may enter a breach mode in which it may transmit a breach message via a long range communication link to report that the wireless tracking device is outside of the beacon area (i.e., outside of the beacon fence/coverage defined by the beacon signal reception range).

Figure 11:
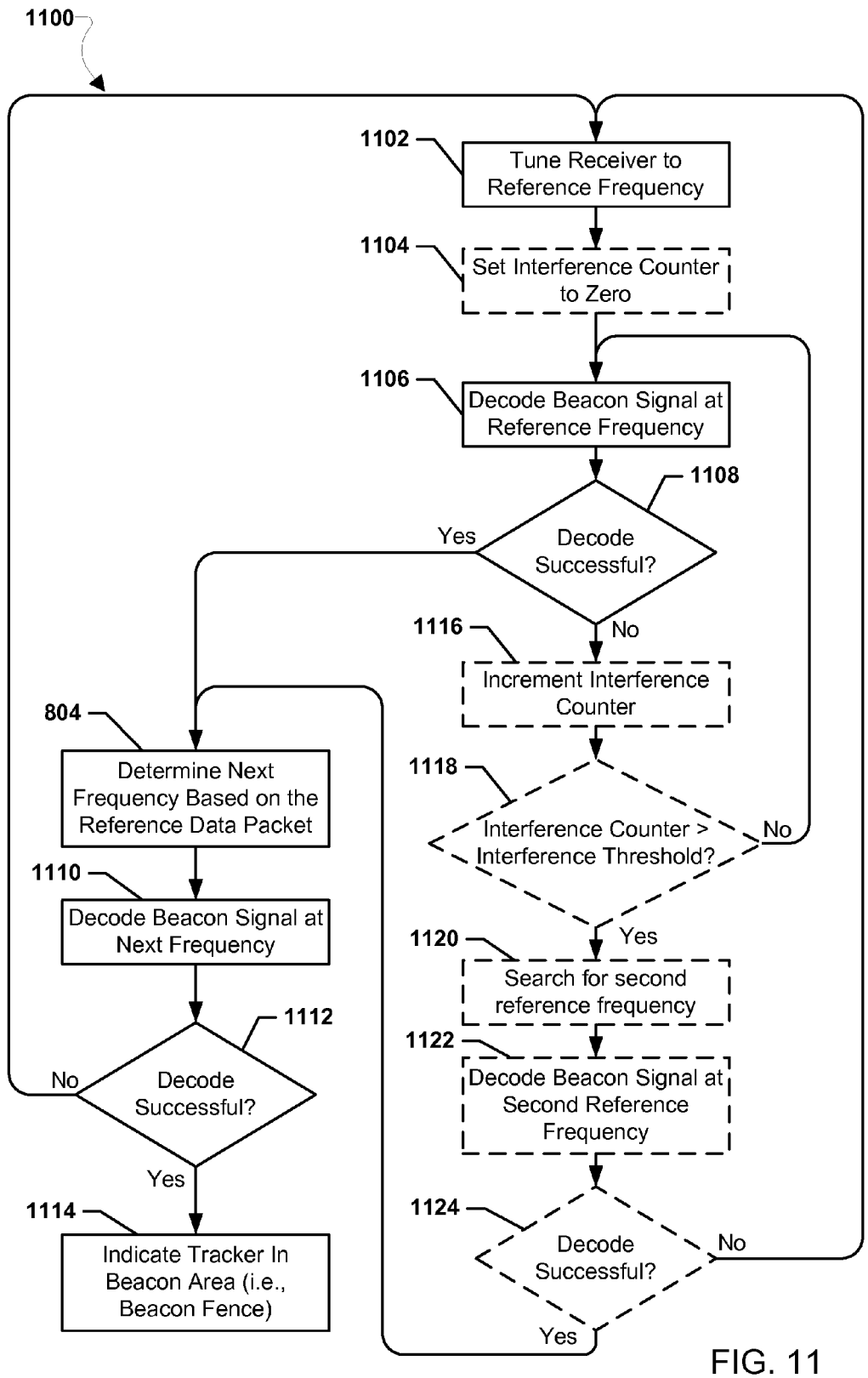
FIG. 11 is a process flow diagram illustrating an embodiment method for determining a wireless tracking device has entered an area.

FIG. 11 illustrates an embodiment method 1100 for recognizing when a wireless tracking device has entered a beacon area (i.e., beacon fence/coverage). In an embodiment, the operations of method 1100 may be performed by the processor of a wireless tracking device. The operations of method 1100 may be performed in conjunction with the operations of methods 500, 800, and/or 1000 described above. In an embodiment, the operations of method 1100 may enable a wireless tracking device to synchronize with a beacon performing the operations of method 700 described above with reference to FIG. 7.

In block 1102 the wireless tracking device processor may tune the wireless tracking device receiver to the reference frequency. In an optional embodiment, in optional block 1104 the wireless tracking device processor may set an interference counter to zero. In block 1106 the wireless tracking device processor may attempt to decode the beacon signal at the reference frequency. In an embodiment, the wireless tracking device processor may attempt to decode the beacon signal at the reference frequency periodically, such as once every second. By attempting to decode the beacon signal only at the reference signal, the wireless tracking device processor may conserve power by limiting its decoding to the reference frequency and not attempting to decode all frequencies on which the beacon signal may be broadcast by the beacon.

In determination block 1108 the wireless tracking device processor may determine whether the beacon signal was decoded successfully. If the beacon signal was decoded successfully (i.e., determination block 1108="Yes"), as discussed above, in block 804 the wireless tracking device processor may determine the next frequency based on the reference data packet. In block 1110 the wireless tracking device processor may attempt to decode the beacon signal at the next frequency. In determination block 1112 the wireless tracking device processor may determine whether the beacon signal was decoded successfully at the next frequency. If the beacon signal was not decoded successfully (i.e., determination block 1112="No"), at block 1102 the wireless tracking device processor may again tune the receiver to the reference frequency and in block 1106 continue to attempt to decode the beacon signal at the reference frequency.

If the beacon signal at the reference frequency is not decoded successfully (i.e., determination block 1108="No"), in an optional embodiment at optional block 1116 the wireless tracking device processor may increment the interference counter. In optional determination block 1118 the wireless tracking device processor may determine whether the interference counter is greater than an interference threshold. An interference threshold may be a value stored in a memory available to the wireless tracking device processor that may indicate the number of times to attempt to decode the reference frequency before determining that interference may be present at that frequency. In an embodiment, the interference threshold may be set high to avoid battery drain if the reference frequency is experiencing interference. If the interference counter is at or below the interference threshold (i.e., optional determination block 1118="No"), in block 1106 the wireless tracking device processor may continue attempting to decode the beacon signal at the reference frequency. If the interference counter exceeds the interference threshold (i.e., optional determination block 1118="Yes"), in optional block 1120 the wireless tracking device processor may search for a second reference frequency. In an optional embodiment, as discussed above, the beacon may transmit the beacon signal at a second reference frequency, and the wireless tracking device processor may tune the wireless tracking device receiver to that second reference frequency. In another optional embodiment, rather than searching for the second reference frequency, the wireless tracking device processor may search all frequencies in the modified frequency hopping pattern to attempt to find the beacon signal.

In optional block 1122 the wireless tracking device processor may attempt to decode the beacon signal at the second reference frequency. In optional determination block 1124 the wireless tracking device processor may determine whether decoding of the beacon signal at the second reference frequency was successful. If the beacon signal was not successfully decoded at the second reference frequency (i.e., optional determination block 1124="No"), in block 1102 the wireless tracking device processor may again tune the receiver to the reference frequency.

If the beacon signal is successfully decoded at the second reference frequency (i.e., optional determination block 1124="Yes"), in block 804 the wireless tracking device processor may determine the next frequency based on the reference data packet and in block 1110 may attempt to decode the beacon signal at the next frequency. If the beacon signal is decoded successfully at the next frequency (i.e., determination block 1112="Yes"), in block 1114 the wireless tracking device processor may determine that the wireless tracking device is inside the beacon area.

Figure 12:
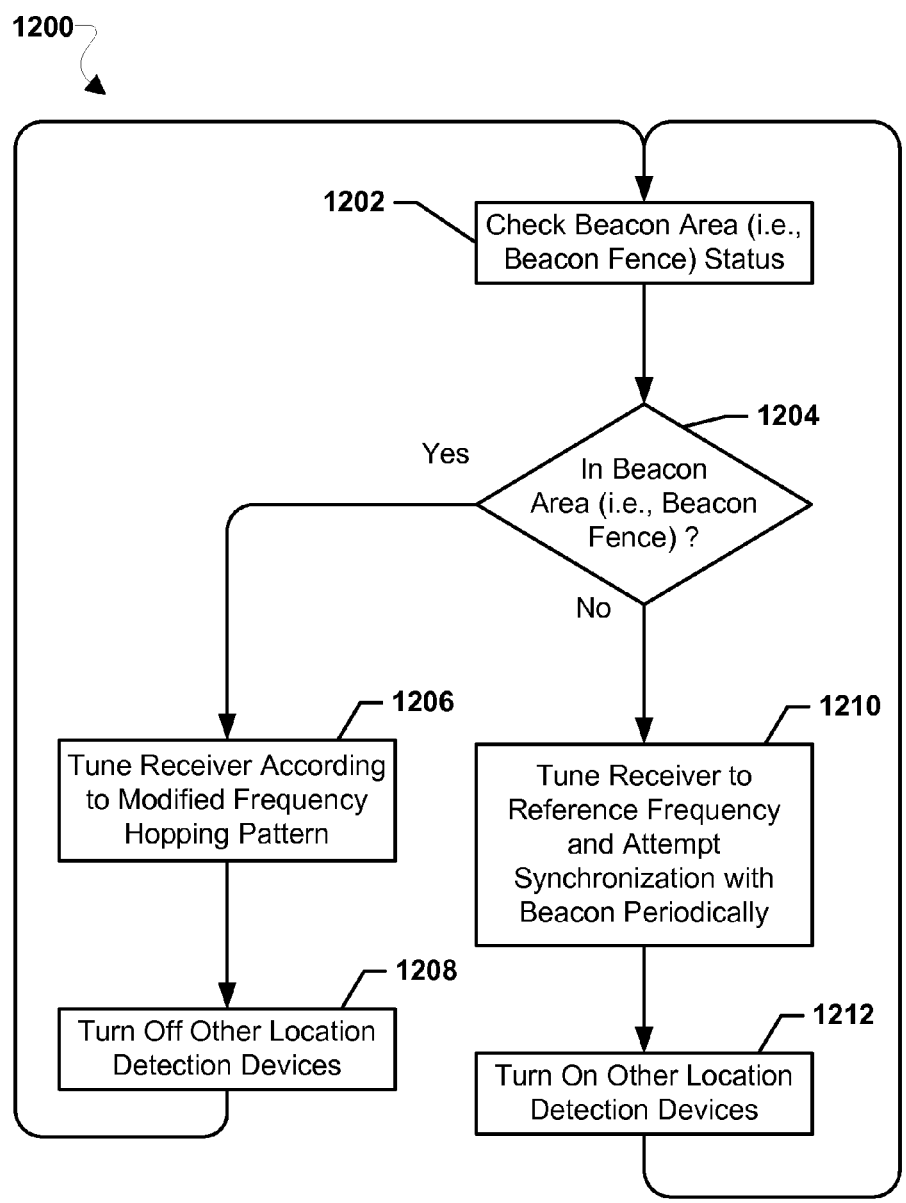
FIG. 12 is a process flow diagram illustrating an embodiment method for controlling wireless tracking device activities based on a relative beacon coverage.

FIG. 12 illustrates an embodiment method 1200 method for controlling wireless tracking device activities based on a relative beacon coverage. In an embodiment, the operations of method 1200 may be performed by the processor of a wireless tracking device. The operations of method 1200 may be performed in conjunction with the operations of methods 500, 800, 1000, and/or 1100 described above. In block 1202 the wireless tracking device processor may check the beacon area (i.e., beacon fence) status. In an embodiment, an indication (e.g., a flag) of the breach status of the wireless tracking device (i.e., whether it is inside or outside a beacon area or fence/coverage) may be stored in a memory available to the wireless tracking device processor. In determination block 1204 the wireless tracking device processor may determine from the breach status indication whether the wireless tracking device is located inside the beacon area (i.e., located within the beacon fence defined by reception of the beacon signal). If the processor determines that the wireless tracking device is inside the beacon area (i.e., determination block 1204="Yes"), in block 1206 the wireless tracking device processor may tune the receiver of the wireless tracking device according to the modified frequency hopping pattern. In block 1208 the wireless tracking device processor may turn off other location detection devices of the wireless tracking device, such as a Global Positioning System (GPS) receiver/system and/or cellular transceiver. In this manner, when inside the beacon fence the wireless tracking device processor may conserve battery power by powering off systems that are unnecessary so long as the wireless tracking device is within the beacon fence defined by the beacon signal. In block 1202 the wireless tracking device processor may continue to check the beacon area status.

If the processor determines from the breach status indication that the wireless tracking device is outside the beacon area (i.e., determination block 1204="No"), in block 1210 the wireless tracking device processor may enter a breach operating mode in which it may periodically tune the receiver to the reference frequency and attempt to synchronize with the beacon signal. In this manner, when outside the beacon fence the wireless tracking device processor may conserve battery life by only attempting to receive the reference frequency of the beacon signal, rather than searching all frequencies on which the beacon signal may be received (i.e., all frequencies in the frequency hopping pattern). Also, as part of the breach mode operations, in block 1212 the wireless tracking device processor may turn on other location detection devices, such as a GPS receiver/system, and a long-range wireless communication transceiver, such as a cellular data network transceiver. In this manner, when outside the beacon fence the wireless tracking device processor may determine its actual position and begin transmitting breach reports, including its location, via the long range communication link. In block 1202 the wireless tracking device processor may continue to check the beacon area/breach status indication to determine whether the wireless tracking device has reentered the beacon area.

Figure 13:
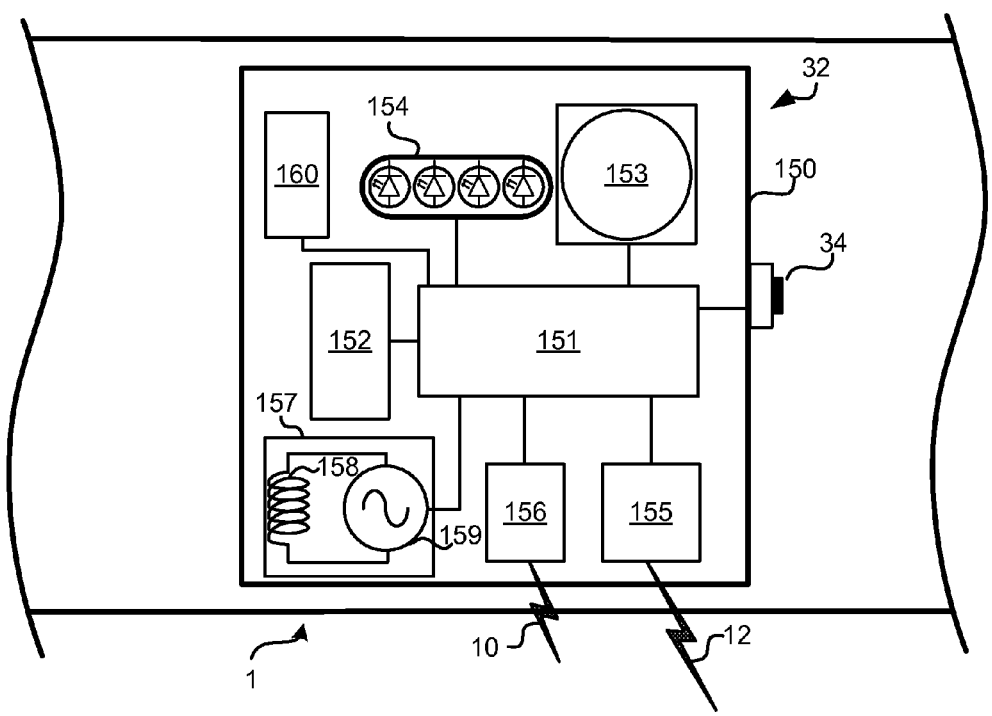
FIG. 13 is a component diagram of an example wireless tracking device suitable for use with the various embodiments.

An example embodiment of a wireless tracking device 1 is illustrated in FIG. 13. In the various embodiments, the wireless tracking device 1 may include a tracking circuitry 150 that is sealed within a housing 32. The housing 32 may be made of any suitable material such as plastic, rubber, stainless steel, etc. The tracking circuitry 150 may include a processor 151 coupled to memory 152 and a power source, such as a battery 153. In an embodiment, the tracking circuitry 150 may also include one or more light emitting diodes (LEDs) 154 that may be used to communicate operational status information. A transceiver 155 such as a long range transceiver or high-power radio, such as a cellular data transceiver, may be coupled to the processor 151 and configured to establish communication links 12 with a long-range wireless network, such as a cellular data network 4. A short range radio 156 may also be coupled to the processor 151 and configured to receive communication signals from a beacon. The wireless tracking device 1 may also include a location detection device 160, such as a GPS receiver, coupled to the processor 151.

The tracking circuitry 150 may also include a user input mechanism 34 coupled to the processor 151, such as a button, small keypad or a switch. The processor 151 may be configured with processor-executable instructions to receive user inputs from the input mechanism and interpret the inputs (e.g., button press, entry of a PIN number, movement of a switch, etc.) as control inputs, such as a user input indicative of expected departure of the tracking device from a safe zone. In an embodiment, the user input mechanism 34 may be an RFID tag or chip that can receive an RFID query signal.

The tracking circuitry 150 may also include an induction charging circuit element 157 so that the battery 153 can be recharged by placing the wireless tracking device 1 in close proximity to an induction charging system. This embodiment enables the asset tracking device to be hermetically sealed. Such an induction charging circuit element 157 may include an induction coil 158 coupled to a rectifier circuit 159. When an alternating magnetic field is applied to the coil 158, alternating electrical currents are induced in the coil and are rectified by the rectifier circuit 159 to output a charging voltage. The charging voltage may be regulated by the processor 151 and used to charge the battery 153. In an alternative embodiment, the induction charging circuit element 157 may be replaced with electrical sockets that are configured to accept pins to establish electrical connections with a charging station.

In an embodiment, the transceiver 155, such as long range transceiver or high-power radio may be a cellular data network transceiver. In another embodiment, the long range transceiver 155 may be configured to communicate with either or both wireless local-area networks (e.g., Wi-Fi) and cellular telephone wireless wide-area networks. In another embodiment, the wireless tracking device 1 may include both a long range transceiver 155 (or high-power radio) and a cellular telephone transceiver, which is not shown separately but would be represented in a similar manner in a component block diagram.

In the various devices, the processor 151 used in an asset wireless tracking device 1 may be any programmable microprocessor, microcomputer, or multiple processor chip or chips that can be configured by software instructions to perform a variety of operations, including the operations of the various embodiments described above. In an embodiment, the processor 151 is a part of one of the internal radios, such as the processor within a cellular network transceiver. Typically, software instructions may be stored in the internal memory 152 before they are accessed and loaded into the processor 151. In some devices, the processor 151 may include internal memory 152 sufficient to store the software instructions. Memory within the processor 151 or internal memory 152 may also be used to store bits or other logical values for tracking operating modes of the device, such as in a control register that may store operating mode bits and/or flags. For the purposes of this description, the term "memory" refers to all memory accessible by the processor 151, including connected memory units 152 and memory within the processor 151 itself. In many devices, the memory 152 may be a volatile or nonvolatile memory, such as flash memory, or a mixture of both.

Figure 14:
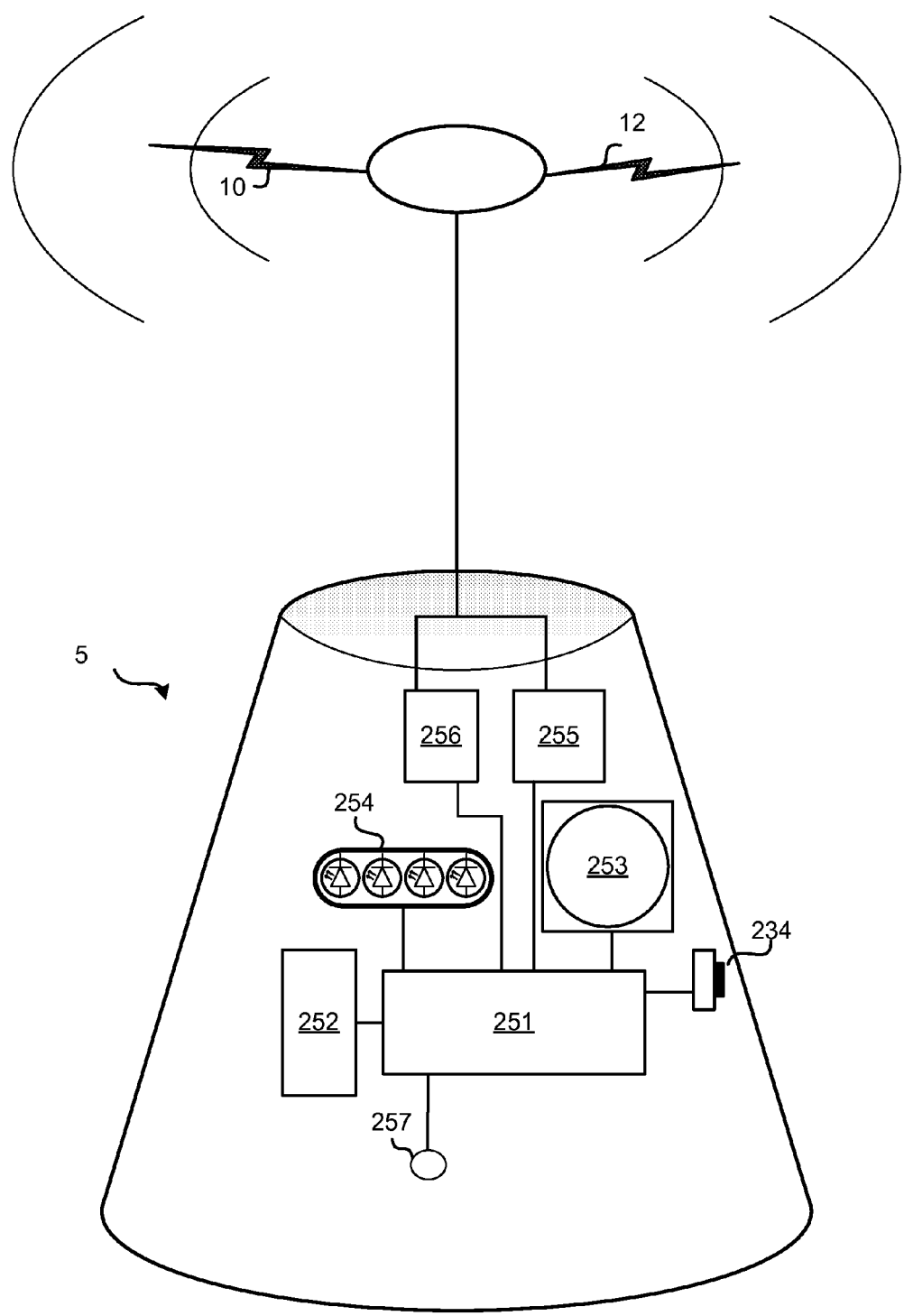
FIG. 14 is a component diagram of an example beacon suitable for use with the various embodiments.

An example embodiment of a beacon 5 is illustrated in FIG. 14. In the various embodiments, the beacon 5 may include a circuitry that is sealed within a housing. The housing may made of any suitable material such as plastic, rubber, stainless steel, etc. The circuitry may include a processor 251 coupled to memory 252 and a power source, such as a battery 253. In an embodiment, the circuitry may also include one or more light emitting diodes (LEDs) 254 that may be used to communicate operational status information. A transceiver 255 such as a long range transceiver or high-power radio, such as a cellular data transceiver, may be coupled to the processor 251 and configured to establish communication links 12 with a long-range wireless network, such as a cellular data network 4. A short range radio 256 may also be coupled to the processor 251 and configured to transmit communication signals to a wireless tracking device. The circuitry may also include a user input mechanism 234 coupled to the processor 251, such as a button, small keypad or a switch. The processor 251 may be configured with processor-executable instructions to receive user inputs from the input mechanism and interpret the inputs (e.g., button press, entry of a PIN number, movement of a switch, etc.) as control inputs, such as a user input activating the beacon. In an embodiment, the user input mechanism 234 may be an RFID tag or chip that can receive an RFID query signal.

In an embodiment, the transceiver 255, such as long range transceiver or high-power radio may be a cellular data network transceiver. In another embodiment, the long range transceiver 255 may be configured to communicate with either or both wireless local-area networks (e.g., Wi-Fi) and cellular telephone wireless wide-area networks. In another embodiment, the beacon 5 may include both a long range transceiver 255 (or high-power radio) and a cellular telephone transceiver which is not shown separately, but would be represented in a similar manner in a component block diagram.

In the various devices, the processor 251 used in an beacon 5 may be any programmable microprocessor, microcomputer, or multiple processor chip or chips that can be configured by software instructions to perform a variety of operations, including the operations of the various embodiments described above. In an embodiment, the processor 251 is a part of one of the internal radios, such as the processor within a cellular network transceiver. Typically, software instructions may be stored in the internal memory 252 before they are accessed and loaded into the processor 251. In some devices, the processor 251 may include internal memory 252 sufficient to store the software instructions. Memory within the processor 251 or internal memory 252 may also be used to store bits or other logical values for tracking operating modes of the device, such as in a control register that may store operating mode bits and/or flags. For the purposes of this description, the term "memory" refers to all memory accessible by the processor 251, including connected memory units 252 and memory within the processor 251 itself. In many devices, the memory 252 may be a volatile or nonvolatile memory, such as flash memory, or a mixture of both.

Figure 15:
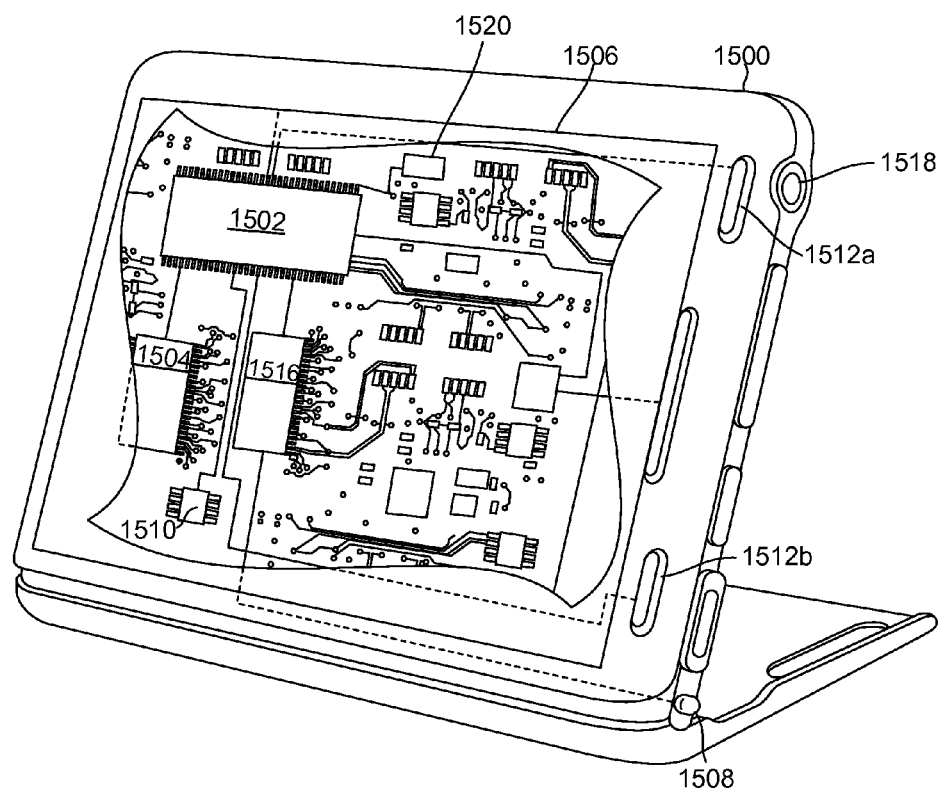
FIG. 15 is a component diagram of an example mobile device suitable for use with the various embodiments.

The various embodiments may be implemented in any of a variety of mobile devices, an example of which is illustrated in FIG. 15. For example, the mobile device 1500 may include a processor 1502 coupled to internal memories 1504 and 1510. Internal memories 1504 and 1510 may be volatile or non-volatile memories, and may also be secure and/or encrypted memories, or unsecure and/or unencrypted memories, or any combination thereof. The processor 1502 may also be coupled to a touch screen display 1506, such as a resistive-sensing touch screen, capacitive-sensing touch screen infrared sensing touch screen, or the like. Additionally, the display of the mobile device 1500 need not have touch screen capability. Additionally, the mobile device 1500 may have one or more antenna 1508 for sending and receiving electromagnetic radiation that may be connected to one or more wireless data link and/or cellular telephone transceiver 1516 coupled to the processor 1502. The mobile device 1500 may also include a location detection device 1520, such as a GPS receiver, coupled to the processor 1502. The mobile device 1500 may also include physical buttons 1512a and 1512b for receiving user inputs. The mobile device 1500 may also include a power button 1518 for turning the mobile device 1500 on and off.

Figure 16:
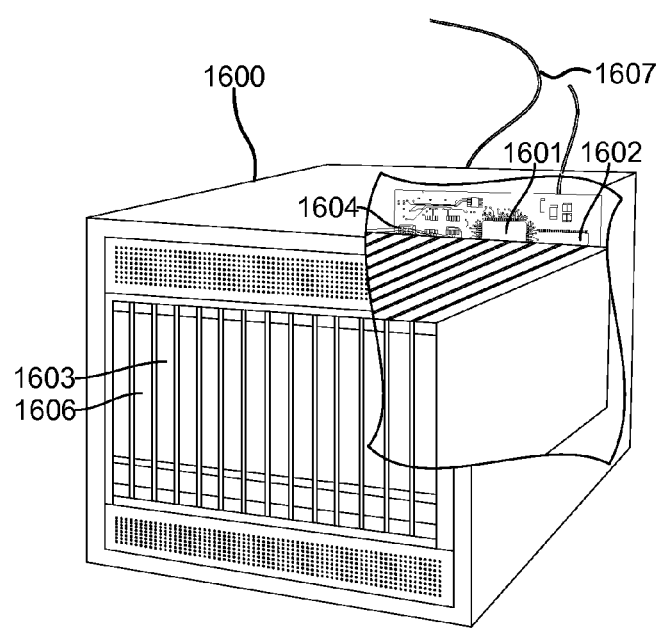
FIG. 16 is a component diagram of an example server suitable for use with the various embodiments

The various embodiments may also be implemented on any of a variety of commercially available server receiver devices, such as the server 1600 illustrated in FIG. 16. Such a server 1600 typically includes a processor 1601 coupled to volatile memory 1602 and a large capacity nonvolatile memory, such as a disk drive 1603. The server 1600 may also include a floppy disc drive, compact disc (CD) or DVD disc drive 1604 coupled to the processor 1601. The server 1600 may also include network access ports 1606 coupled to the processor 1601 for establishing network interface connections with a network 1607, such as a local area network coupled to a beacon or other asset tracking system servers.

The processors 1502, 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1504, 1510, 1602, and 1603 before they are accessed and loaded into the processors 1502, 1601. The processors 1502, 1601 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1502, 1601 including internal memory or removable memory plugged into the device and memory within the processors 1502, 1601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of generating frequency hopping signals of a beacon to facilitate synchronization by a wireless tracking device, comprising:
   generating a high redundancy pattern of a reference frequency;
   generating a pseudo random sequence of frequencies, wherein each frequency of the pseudo random sequence of frequencies is different than the reference frequency; and
   multiplexing the high redundancy pattern of the reference frequency with the pseudo random sequence of frequencies to generate a modified frequency hopping pattern.

2. The method of claim 1, further comprising:
   transmitting a beacon signal by switching a carrier signal of the beacon signal according to the modified frequency hopping pattern.

3. The method of claim 2, further comprising determining whether the wireless tracking device is inside a predetermined area defined by a reception range of the beacon by:
   receiving the beacon signal in the wireless tracking device by tuning a receiver according to the modified frequency hopping pattern;
   determining whether decoding of the beacon signal was successful at a current frequency according to the modified frequency hopping pattern;
   incrementing a failure counter and tuning the receiver to a next frequency according to the modified frequency hopping pattern in response to determining that decoding of the beacon signal was not successful at the current frequency;
   determining whether decoding of the beacon signal was successful at the next frequency;
   incrementing the failure counter in response to determining that decoding of the beacon signal was not successful at the next frequency;
   determining whether the failure counter exceeds a failure threshold value; and
   determining whether the wireless tracking device is outside the predetermined area in response to determining that the failure counter exceeds the failure threshold value.

4. The method of claim 2, wherein the beacon signal comprises a data packet, the method further comprising:
   determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;
   including an indication of the next frequency in the data packet to generate a reference data packet; and
   transmitting the reference data packet as the beacon signal at the next scheduled transmission of the beacon signal at the reference frequency.

5. The method of claim 4, further comprising synchronizing the wireless tracking device by:
receiving the reference data packet in the wireless tracking device by tuning a receiver of the wireless tracking device to the reference frequency;
determining a next frequency to tune the receiver to based on the indication of the next frequency in the reference data packet;
comparing a sequence of the reference frequency and the determined next frequency to the modified frequency hopping pattern to identify a current point in the modified frequency hopping pattern; and
tuning the receiver according to the modified frequency hopping pattern from the current point in the modified frequency hopping pattern.

6. The method of claim 4, further comprising determining whether the wireless tracking device is inside a predetermined area defined by a reception range of the beacon by:
receiving the reference data packet in the wireless tracking device by tuning a receiver of the wireless tracking device to the reference frequency;
determining a next frequency to tune the receiver to based on the indication of the next frequency in the reference data packet;
tuning the receiver to the determined next frequency;
determining whether decoding of the beacon signal was successful at the determined next frequency; and
determining that the wireless tracking device is inside the predetermined area in response to determining that the decoding of the beacon signal was successful at the determined next frequency.

7. The method of claim 4, wherein the reference frequency is a first reference frequency, the method further comprising:
transmitting the reference data packet as the beacon signal at a second reference frequency at the next scheduled transmission of the beacon signal; and
determining whether the wireless tracking device is inside a predetermined area defined by a reception range of the beacon by:
receiving the beacon signal in the wireless tracking device by tuning a receiver of the wireless tracking device to the first reference frequency;
determining whether decoding of the beacon signal is successful at the first reference frequency;
tuning the receiver to the second reference frequency in response to determining that decoding of the beacon signal is not successful at the first reference frequency;
receiving the reference data packet in the wireless tracking device by tuning the receiver of the wireless tracking device to the second reference frequency;
determining a next frequency to tune the receiver to based on the indication of the next frequency in the received reference data packet;
tuning the receiver to the determined next frequency;
determining whether decoding of the beacon signal was successful at the determined next frequency; and
indicating the wireless tracking device is inside the predetermined area in response to determining that decoding of the beacon signal was successful at the determined next frequency.

8. A communication system, comprising:
a beacon; and
a wireless tracking device,
wherein the beacon comprises:
means for generating a high redundancy pattern of a reference frequency;
means for generating a pseudo random sequence of frequencies, wherein each frequency of the pseudo random sequence of frequencies is different than the reference frequency; and
means for multiplexing the high redundancy pattern of the reference frequency with the pseudo random sequence of frequencies to generate a modified frequency hopping pattern.

9. The communication system of claim 8, wherein the beacon further comprises:
means for transmitting a beacon signal by switching a carrier signal of the beacon signal according to the modified frequency hopping pattern.

10. The communication system of claim 9, wherein the wireless tracking device further comprises:
means for receiving the beacon signal in the wireless tracking device by tuning a receiver according to the modified frequency hopping pattern;
means for determining whether decoding of the beacon signal was successful at a current frequency according to the modified frequency hopping pattern;
means for incrementing a failure counter and tuning the receiver to a next frequency according to the modified frequency hopping pattern in response to determining that decoding of the beacon signal was not successful at the current frequency;
means for determining whether decoding of the beacon signal was successful at the next frequency;
means for incrementing the failure counter in response to determining that decoding of the beacon signal was not successful at the next frequency;
means for determining whether the failure counter exceeds a failure threshold value; and
means for determining whether the wireless tracking device is outside a predetermined area in response to determining that the failure counter exceeds the failure threshold value.

11. The communication system of claim 9, wherein the beacon signal comprises a data packet, and
wherein the wireless tracking device further comprises:
means for determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;
means for including an indication of the next frequency in the data packet to generate a reference data packet; and
means for transmitting the reference data packet as the beacon signal at the next scheduled transmission of the beacon signal at the reference frequency.

12. The communication system of claim 11, wherein the wireless tracking device further comprises:
means for receiving the reference data packet in the wireless tracking device by tuning a receiver of the wireless tracking device to the reference frequency;
means for determining a next frequency to tune the receiver to based on the indication of the next frequency in the reference data packet;
means for comparing a sequence of the reference frequency and the determined next frequency to the modified frequency hopping pattern to identify a current point in the modified frequency hopping pattern; and means for tuning the receiver according to the modified frequency hopping pattern from the current point in the modified frequency hopping pattern.

13. The communication system of claim 11, wherein the wireless tracking device further comprises:
   means for receiving the reference data packet in the wireless tracking device by tuning a receiver of the wireless tracking device to the reference frequency;
   means for determining a next frequency to tune the receiver to based on the indication of the next frequency in the reference data packet;
   means for tuning the receiver to the determined next frequency;
   means for determining whether decoding of the beacon signal was successful at the determined next frequency; and
   means for determining whether the wireless tracking device is inside a predetermined area in response to determining that the decoding of the beacon signal was successful at the determined next frequency.

14. The communication system of claim 11, wherein the reference frequency is a first reference frequency,
   wherein the beacon further comprises means for transmitting the reference data packet as the beacon signal at a second reference frequency at the next scheduled transmission of the beacon signal, and
   wherein the wireless tracking device further comprises:
      means for receiving the beacon signal in the wireless tracking device by tuning a receiver of the wireless tracking device to the first reference frequency;
      means for determining whether decoding of the beacon signal is successful at the first reference frequency;
      means for tuning the receiver to the second reference frequency in response to determining that decoding of the beacon signal is not successful at the first reference frequency;
      means for receiving the reference data packet in the wireless tracking device by tuning the receiver of the wireless tracking device to the second reference frequency;
      means for determining a next frequency to tune the receiver to based on the indication of the next frequency in the received reference data packet;
      means for tuning the receiver to the determined next frequency;
      means for determining whether decoding of the beacon signal was successful at the determined next frequency; and
      means for indicating the wireless tracking device is inside a predetermined area in response to determining that decoding of the beacon signal was successful at the determined next frequency.

15. A communication system, comprising:
   a beacon, comprising:
      a transmitter circuit; and
      a beacon processor coupled to the transmitter circuit; and
   a wireless tracking device, comprising:
      a receiver circuit; and
      a device processor coupled to the receiver circuit,
   wherein the beacon processor is configured with processor-executable instructions to perform operations comprising:
      generating a high redundancy pattern of a reference frequency;
      generating a pseudo random sequence of frequencies, wherein each frequency of the pseudo random sequence of frequencies is different than the reference frequency; and
      multiplexing the high redundancy pattern of the reference frequency with the pseudo random sequence of frequencies to generate a modified frequency hopping pattern.

16. The communication system of claim 15, wherein the beacon processor is configured with processor-executable instructions to perform operations further comprising:
   transmitting, via the transmitter circuit, a beacon signal by switching a carrier signal of the beacon signal according to the modified frequency hopping pattern.

17. The communication system of claim 16, wherein the device processor is configured with processor-executable instructions to perform operations to determine whether the wireless tracking device is inside a predetermined area defined by a reception range of the beacon by:
   receiving the beacon signal in the wireless tracking device by tuning the receiver circuit according to the modified frequency hopping pattern;
   determining whether decoding of the beacon signal was successful at a current frequency according to the modified frequency hopping pattern;
   incrementing a failure counter and tuning the receiver circuit to a next frequency according to the modified frequency hopping pattern in response to determining that decoding of the beacon signal was not successful at the current frequency;
   determining whether decoding of the beacon signal was successful at the next frequency;
   incrementing the failure counter in response to determining that decoding of the beacon signal was not successful at the next frequency;
   determining whether the failure counter exceeds a failure threshold value; and
   determining whether the wireless tracking device is outside the predetermined area in response to determining that the failure counter exceeds the failure threshold value.

18. The communication system of claim 16, wherein the beacon processor is configured with processor-executable instructions to perform operations such that the beacon signal comprises a data packet, and
   wherein the beacon processor is configured with processor-executable instructions to perform operations further comprising:
      determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;
      including an indication of the next frequency in the data packet to generate a reference data packet; and
      transmitting, via the transmitter circuit, the reference data packet as the beacon signal at the next scheduled transmission of the beacon signal at the reference frequency.

19. The communication system of claim 18, wherein the device processor is configured with processor-executable instructions to perform operations to synchronize the wireless tracking device by:

receiving the reference data packet in the wireless tracking device by tuning the receiver circuit of the wireless tracking device to the reference frequency;

determining a next frequency to tune the receiver circuit to based on the indication of the next frequency in the reference data packet;

comparing a sequence of the reference frequency and the determined next frequency to the modified frequency hopping pattern to identify a current point in the modified frequency hopping pattern; and tuning the receiver circuit according to the modified frequency hopping pattern from the current point in the modified frequency hopping pattern.

20. The communication system of claim 18, wherein the device processor is configured with processor-executable instructions to perform operations to determine whether the wireless tracking device is inside a predetermined area defined by a reception range of the beacon by:

receiving the reference data packet in the wireless tracking device by tuning the receiver circuit of the wireless tracking device to the reference frequency;

determining a next frequency to tune the receiver circuit to based on the indication of the next frequency in the reference data packet;

tuning the receiver circuit to the determined next frequency;

determining whether decoding of the beacon signal was successful at the determined next frequency; and determining that the wireless tracking device is inside the predetermined area in response to determining that the decoding of the beacon signal was successful at the determined next frequency.

21. The communication system of claim 18, wherein the beacon processor is configured with processor-executable instructions to perform operations such that the reference frequency is a first reference frequency, wherein the beacon processor is configured with processor-executable instructions to perform operations further comprising transmitting, via the transmitter circuit, the reference data packet as the beacon signal at a second reference frequency at the next scheduled transmission of the beacon signal, and wherein the device processor is configured with processor-executable instructions to perform operations to determine whether the wireless tracking device is inside a predetermined area defined by a reception range of the beacon by:

receiving the beacon signal in the wireless tracking device by tuning the receiver circuit of the wireless tracking device to the first reference frequency;

determining whether decoding of the beacon signal is successful at the first reference frequency;

tuning the receiver circuit to the second reference frequency in response to determining that decoding of the beacon signal is not successful at the first reference frequency;

receiving the reference data packet in the wireless tracking device by tuning the receiver circuit of the wireless tracking device to the second reference frequency;

determining a next frequency to tune the receiver circuit to based on the indication of the next frequency in the received reference data packet;

tuning the receiver circuit to the determined next frequency;

determining whether decoding of the beacon signal was successful at the determined next frequency; and indicating the wireless tracking device is inside the predetermined area in response to determining that decoding of the beacon signal was successful at the determined next frequency.

22. A beacon, comprising:
a transmitter circuit; and
a beacon processor coupled to the transmitter circuit, wherein the beacon processor is configured with processor-executable instructions to perform operations comprising:
generating a high redundancy pattern of a reference frequency;
generating a pseudo random sequence of frequencies, wherein each frequency of the pseudo random sequence of frequencies is different than the reference frequency; and
multiplexing the high redundancy pattern of the reference frequency with the pseudo random sequence of frequencies to generate a modified frequency hopping pattern.

23. The beacon of claim 22, wherein the beacon processor is configured with processor-executable instructions to perform operations further comprising:
transmitting, via the transmitter circuit, a beacon signal by switching a carrier signal of the beacon signal according to the modified frequency hopping pattern.

24. The beacon of claim 23, wherein the beacon processor is configured with processor-executable instructions to perform operations such that the beacon signal comprises a data packet, and
wherein the beacon processor is configured with processor-executable instructions to perform operations further comprising:
determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;
including an indication of the next frequency in the data packet to generate a reference data packet; and
transmitting, via the transmitter circuit, the reference data packet as the beacon signal at the next scheduled transmission of the beacon signal at the reference frequency.

25. A beacon, comprising:
means for generating a high redundancy pattern of a reference frequency;
means for generating a pseudo random sequence of frequencies, wherein each frequency of the pseudo random sequence of frequencies is different than the reference frequency; and
means for multiplexing the high redundancy pattern of the reference frequency with the pseudo random sequence of frequencies to generate a modified frequency hopping pattern.

26. The beacon of claim 25, further comprising:
means for transmitting a beacon signal by switching a carrier signal of the beacon signal according to the modified frequency hopping pattern.

27. The beacon of claim 26, wherein the beacon signal comprises a data packet, the beacon further comprising:
means for determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;

means for including an indication of the next frequency in the data packet to generate a reference data packet; and means for transmitting the reference data packet as the beacon signal at the next scheduled transmission of the beacon signal at the reference frequency.

28. A non-transitory processor-readable medium having stored thereon processor-executable instructions configured to cause a beacon processor to perform operations comprising:

generating a high redundancy pattern of a reference frequency;

generating a pseudo random sequence of frequencies, wherein each frequency of the pseudo random sequence of frequencies is different than the reference frequency; and multiplexing the high redundancy pattern of the reference frequency with the pseudo random sequence of frequencies to generate a modified frequency hopping pattern.

29. The non-transitory processor-readable medium of claim 28, wherein the stored processor-executable instructions are configured to cause a beacon processor to perform operations further comprising:

transmitting a beacon signal by switching a carrier signal of the beacon signal according to the modified frequency hopping pattern.

30. The non-transitory processor-readable medium of claim 29, wherein the stored processor-executable instructions are configured to cause a beacon processor to perform operations such that the beacon signal comprises a data packet, and wherein the stored processor-executable instructions are configured to cause a beacon processor to perform operations further comprising:

determining, prior to a next scheduled transmission of the beacon signal at the reference frequency according to the modified frequency hopping pattern, a next frequency of the pseudo random sequence of frequencies at which the carrier signal will be transmitted following the next scheduled transmission of the beacon signal at the reference frequency;

including an indication of the next frequency in the data packet to generate a reference data packet; and transmitting the reference data packet as the beacon signal at the next scheduled transmission of the beacon signal at the reference frequency.

31. A wireless tracking device, comprising:

a receiver circuit; and a device processor coupled to the receiver, wherein the device processor is configured with processor-executable instructions to perform operations to determine whether the wireless tracking device is inside a predetermined area defined by a reception range of a beacon by:

receiving a beacon signal in the wireless tracking device by tuning the receiver circuit according to a modified frequency hopping pattern, the modified frequency hopping pattern comprising a high redundancy pattern of a reference frequency multiplexed with a pseudo random sequence of frequencies wherein each frequency of the pseudo random sequence of frequencies is different than the reference frequency;

determining whether decoding of the beacon signal was successful at a current frequency according to the modified frequency hopping pattern;

incrementing a failure counter and tuning the receiver circuit to a next frequency according to the modified frequency hopping pattern in response to determining that decoding of the beacon signal was not successful at the current frequency;

determining whether decoding of the beacon signal was successful at the next frequency;

incrementing the failure counter in response to determining that decoding of the beacon signal was not successful at the next frequency;

determining whether the failure counter exceeds a failure threshold value; and determining whether the wireless tracking device is outside the predetermined area in response to determining that the failure counter exceeds the failure threshold value.

32. A wireless tracking device, comprising:

means for receiving a beacon signal in the wireless tracking device by tuning a receiver according to a modified frequency hopping pattern, the modified frequency hopping pattern comprising a high redundancy pattern of a reference frequency multiplexed with a pseudo random sequence of frequencies wherein each frequency of the pseudo random sequence of frequencies is different than the reference frequency;

means for determining whether decoding of the beacon signal was successful at a current frequency according to the modified frequency hopping pattern;

means for incrementing a failure counter and tuning the receiver to a next frequency according to the modified frequency hopping pattern in response to determining that decoding of the beacon signal was not successful at the current frequency;

means for determining whether decoding of the beacon signal was successful at the next frequency;

means for incrementing the failure counter in response to determining that decoding of the beacon signal was not successful at the next frequency;

means for determining whether the failure counter exceeds a failure threshold value; and means for determining whether the wireless tracking device is outside a predetermined area in response to determining that the failure counter exceeds the failure threshold value.

33. A non-transitory processor-readable medium having stored thereon processor-executable instructions configured to cause a wireless tracking device processor to perform operations to determine whether the wireless tracking device is inside a predetermined area defined by a reception range of a beacon by:

receiving a beacon signal in the wireless tracking device by tuning a receiver according to a modified frequency hopping pattern, the modified frequency hopping pattern comprising a high redundancy pattern of a reference frequency multiplexed with a pseudo random sequence of frequencies wherein each frequency of the pseudo random sequence of frequencies is different than the reference frequency;

determining whether decoding of the beacon signal was successful at a current frequency according to the modified frequency hopping pattern;

incrementing a failure counter and tuning the receiver to a next frequency according to the modified frequency hopping pattern in response to determining that decoding of the beacon signal was not successful at the current frequency;

determining whether decoding of the beacon signal was successful at the next frequency;

incrementing the failure counter in response to determining that decoding of the beacon signal was not successful at the next frequency;

determining whether the failure counter exceeds a failure threshold value; and determining whether the wireless tracking device is outside the predetermined area in response to determining that the failure counter exceeds the failure threshold value.

34. A wireless tracking device, comprising:

a receiver circuit; and a device processor coupled to the receiver circuit, wherein the device processor is configured with processor-executable instructions to perform operations to synchronize the wireless tracking device by:

receiving a reference data packet in the wireless tracking device by tuning the receiver circuit of the wireless tracking device to a reference frequency;

determining a next frequency to tune the receiver circuit to based on an indication of a next frequency in the reference data packet;

comparing a sequence of the reference frequency and the determined next frequency to a modified frequency hopping pattern to identify a current point in the modified frequency hopping pattern, the modified frequency hopping pattern comprising a high redundancy pattern of the reference frequency multiplexed with a pseudo random sequence of frequencies wherein each frequency of the pseudo random sequence of frequencies is different than the reference frequency; and tuning the receiver circuit according to the modified frequency hopping pattern from the current point in the modified frequency hopping pattern.

35. A wireless tracking device, comprising:

means for receiving a reference data packet in the wireless tracking device by tuning a receiver of the wireless tracking device to a reference frequency;

means for determining a next frequency to tune the receiver to based on an indication of a next frequency in the reference data packet;

means for comparing a sequence of the reference frequency and the determined next frequency to a modified frequency hopping pattern to identify a current point in the modified frequency hopping pattern, the modified frequency hopping pattern comprising a high redundancy pattern of the reference frequency multiplexed with a pseudo random sequence of frequencies wherein each frequency of the pseudo random sequence of frequencies is different than the reference frequency; and means for tuning the receiver according to the modified frequency hopping pattern from the current point in the modified frequency hopping pattern.

36. A non-transitory processor-readable medium having stored thereon processor-executable instructions configured to cause a wireless tracking device processor to perform operations to synchronize the wireless tracking device by:

receiving a reference data packet in the wireless tracking device by tuning a receiver of the wireless tracking device to a reference frequency;

determining a next frequency to tune the receiver to based on an indication of a next frequency in the reference data packet;

comparing a sequence of the reference frequency and the determined next frequency to a modified frequency hopping pattern to identify a current point in the modified frequency hopping pattern, the modified frequency hopping pattern comprising a high redundancy pattern of the reference frequency multiplexed with a pseudo random sequence of frequencies wherein each frequency of the pseudo random sequence of frequencies is different than the reference frequency; and tuning the receiver according to the modified frequency hopping pattern from the current point in the modified frequency hopping pattern.

37. A wireless tracking device, comprising:

a receiver circuit; and a device processor coupled to the receiver, wherein the device processor is configured with processor-executable instructions to perform operations to determine whether the wireless tracking device is inside a predetermined area defined by a reception range of a beacon by:

receiving a reference data packet in the wireless tracking device by tuning the receiver circuit of the wireless tracking device to a reference frequency;

determining a next frequency to tune the receiver circuit to based on an indication of a next frequency in the reference data packet;

tuning the receiver circuit to the determined next frequency; determining whether decoding of a beacon signal was successful at the determined next frequency; and determining that the wireless tracking device is inside the predetermined area in response to determining that the decoding of the beacon signal was successful at the determined next frequency.

38. A wireless tracking device, comprising:

means for receiving a reference data packet in the wireless tracking device by tuning a receiver of the wireless tracking device to a reference frequency;

means for determining a next frequency to tune the receiver to based on an indication of a next frequency in the reference data packet;

means for tuning the receiver to the determined next frequency;

means for determining whether decoding of a beacon signal was successful at the determined next frequency; and means for determining that the wireless tracking device is inside a predetermined area in response to determining that the decoding of the beacon signal was successful at the determined next frequency.

39. A non-transitory processor-readable medium having stored thereon processor-executable instructions configured to cause a wireless tracking device processor to perform operations to determine whether the wireless tracking device is inside a predetermined area defined by a reception range of a beacon by:

receiving a reference data packet in the wireless tracking device by tuning a receiver of the wireless tracking device to a reference frequency;

determining a next frequency to tune the receiver to based on an indication of a next frequency in the reference data packet;

tuning the receiver to the determined next frequency;

determining whether decoding of a beacon signal was successful at the determined next frequency; and determining that the wireless tracking device is inside the predetermined area in response to determining that the decoding of the beacon signal was successful at the determined next frequency.

40. A wireless tracking device, comprising:

a receiver circuit; and a device processor coupled to the receiver, wherein the device processor is configured with processor-executable instructions to perform operations to determine whether the wireless tracking device is inside a predetermined area defined by a reception range of a beacon by:

receiving a beacon signal in the wireless tracking device by tuning the receiver circuit of the wireless tracking device to a first reference frequency;

determining whether decoding of the beacon signal is successful at the first reference frequency;

tuning the receiver circuit to a second reference frequency in response to determining that decoding of the beacon signal is not successful at the first reference frequency;

receiving a reference data packet in the wireless tracking device by tuning the receiver circuit of the wireless tracking device to the second reference frequency;

determining a next frequency to tune the receiver to based on an indication of a next frequency in the received reference data packet;

tuning the receiver circuit to the determined next frequency;

determining whether decoding of the beacon signal was successful at the determined next frequency; and indicating the wireless tracking device is inside the predetermined area in response to determining that decoding of the beacon signal was successful at the determined next frequency.

41. A wireless tracking device, comprising:

means for receiving a beacon signal in the wireless tracking device by tuning a receiver of the wireless tracking device to a first reference frequency;

means for determining whether decoding of the beacon signal is successful at the first reference frequency;

means for tuning the receiver to a second reference frequency in response to determining that decoding of the beacon signal is not successful at the first reference frequency;

means for receiving a reference data packet in the wireless tracking device by tuning the receiver of the wireless tracking device to the second reference frequency;

means for determining a next frequency to tune the receiver to based on an indication of a next frequency in the received reference data packet;

means for tuning the receiver to the determined next frequency;

means for determining whether decoding of the beacon signal was successful at the determined next frequency; and means for indicating the wireless tracking device is inside a predetermined area in response to determining that decoding of the beacon signal was successful at the determined next frequency.

42. A non-transitory processor-readable medium having stored thereon processor-executable instructions configured to cause a wireless tracking device processor to perform operations to determine whether the wireless tracking device is inside a predetermined area defined by a reception range of a beacon by:

receiving a beacon signal in the wireless tracking device by tuning a receiver of the wireless tracking device to a first reference frequency;

determining whether decoding of the beacon signal is successful at the first reference frequency;

tuning the receiver to a second reference frequency in response to determining that decoding of the beacon signal is not successful at the first reference frequency;

receiving a reference data packet in the wireless tracking device by tuning the receiver of the wireless tracking device to the second reference frequency;

determining a next frequency to tune the receiver to based on an indication of a next frequency in the received reference data packet;

tuning the receiver to the determined next frequency;

determining whether decoding of the beacon signal was successful at the determined next frequency; and indicating the wireless tracking device is inside the predetermined area in response to determining that decoding of the beacon signal was successful at the determined next frequency.

\* \* \* \* \*